US008488247B2

(12) United States Patent
Cai et al.

(10) Patent No.: US 8,488,247 B2

(45) Date of Patent: Jul. 16, 2013

(54) SYSTEM, METHOD AND APPARATUS FOR MODIFYING THE VISIBILITY PROPERTIES OF AN OBJECT

(75) Inventors: Wenshan Cai, Sunnyvale, CA (US); Vladimir M. Shalaev, West Lafayette, IN (US); Uday K. Chettiar, Philadelphia, PA (US); Alexander V. Kildishev, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 415 days.

(21) Appl. No.: 12/573,610

(22) Filed: Oct. 5, 2009

(65) Prior Publication Data

US 2010/0110559 A1 May 6, 2010

Related U.S. Application Data

(60) Provisional application No. 61/103,025, filed on Oct. 6, 2008.

(51) Int. Cl.
*G02B 9/00* (2006.01)
*G02B 13/00* (2006.01)

(52) U.S. Cl.
USPC ............................ 359/642; 359/722; 359/741

(58) Field of Classification Search
USPC .......................................... 359/642, 796, 741
See application file for complete search history.

(56) References Cited

U.S. PATENT DOCUMENTS

| | | | |
|---|---|---|---|
| 6,756,932 | B1 | 6/2004 | Barker et al. |
| 6,788,273 | B1 | 9/2004 | Schultz et al. |
| 6,859,114 | B2 | 2/2005 | Eleftheriades et al. |
| 6,933,812 | B2 | 8/2005 | Sarabandi et al. |
| 6,938,325 | B2 | 9/2005 | Tanielian |
| 7,106,918 | B2 | 9/2006 | Bita et al. |
| 7,184,623 | B2 | 2/2007 | Cai et al. |
| 7,349,613 | B2 | 3/2008 | Wang |
| 7,421,178 | B2 | 9/2008 | Podolskiy et al. |
| 7,482,727 | B2 | 1/2009 | Bratkovski et al. |
| 7,538,946 | B2 | 5/2009 | Smith et al. |
| 8,253,639 | B2 | 8/2012 | Cohen |
| 2005/0221128 | A1 | 10/2005 | Kochergin |
| 2007/0114431 | A1 | 5/2007 | Wang et al. |
| 2007/0188385 | A1 | 8/2007 | Hyde et al. |
| 2007/0273055 | A1 | 11/2007 | Sazio et al. |
| 2008/0024792 | A1 | 1/2008 | Pendry et al. |
| 2008/0138571 | A1 | 6/2008 | Sazio et al. |

(Continued)

OTHER PUBLICATIONS

Alu, A. et al., "Achieving transparency with plasmonic and metamaterial coatings," Physical Review E 72, © 2005 The American Physical Society, pp. 016623-1 to 016623-9.

(Continued)

*Primary Examiner* — Jordan Schwartz

(74) *Attorney, Agent, or Firm* — Brinks Hofer Gilson & Lione

(57) ABSTRACT

An object is disposed such that the apparatus is between the object and an observer. The appearance of the object is altered and, in the limit, the object cannot be observed, and the background appears unobstructed. The apparatus is formed of a metamaterial where the properties of the metamaterial are varied as a function of distance from the interfaces. The metamaterial may be fabricated as a composite material having a dielectric component and inclusions of particles of sub-wavelength size, and may also include a gain medium.

12 Claims, 8 Drawing Sheets

U.S. PATENT DOCUMENTS

| | | | | |
|---|---|---|---|---|
| 2008/0165442 | A1 | 7/2008 | Cai et al. | |
| 2009/0040132 | A1 | 2/2009 | Sridhar et al. | |
| 2009/0173886 | A1* | 7/2009 | Chowdhury | 250/393 |
| 2009/0273538 | A1 | 11/2009 | Smith et al. | |
| 2010/0020415 | A1* | 1/2010 | Tonucci | 359/712 |
| 2010/0086272 | A1* | 4/2010 | Li et al. | 385/129 |
| 2010/0110559 | A1 | 5/2010 | Cai et al. | |

OTHER PUBLICATIONS

Aspnes, D. E., “Optical Properties of Thin Films,” Thin Solid Films, 89 (1982), Electronics and Optics, presented at the Fifth International Thin Films Congress, Herzha-on-Sea, Israel, Sep. 21-25, 1981, © Elsevier Sequoia, pp. 249-262.
Cai, Wenshan et al., “Nonmagnetic cloak with minimized scattering,” Applied Physics Letters 91, (accepted Aug. 20, 2007; published online Sep. 11, 2007), © 2007 American Institute of Physics, pp. 111105-1 to 111105-3.
Chettiar, U.K. et al., “From Low-loss to Lossless Optical Negative-Index Materials,” © 2006 Optical Society of America, 2 pages.
Cummer, S. et al., “Full-wave simulations of electromagnetic cloaking structures,” Physical Review E 74, © 2006 The American Physical Society, pp. 036621-1 to 036621-5.
Garcia de Abajo, F.J. et al., “Tunneling Mechanism of Light Transmission through Metallic Films,” Physical Review Letters, week ending Aug. 5, 2005, © 2005 The American Physical Society, pp. 067403-1 to 067403-4.
Johnson, P.B. et al., “Optical Constants of the Noble Metals,” Physical Review B, vol. 6, No. 12, Dec. 15, 1972, pp. 4370-4379.
Kildishev, A. et al., “Negative refractive index in optics of metal-dielectric composites,” vol. 23, No. 3/Mar. 2006/J. Opt. Soc. Am. B., (accepted Sep. 22, 2005; posted Nov. 29, 2005) © 2006 Optical Society of America, pp. 423-433.
Klein, M.W. et al., “Single-slit split ring resonators at optical frequencies: limits of size scaling,” May 1, 2006/vol. 31, No. 9/ Optics Letters, (accepted Jan. 30, 2006; posted Feb. 9, 2006), © 2006 Optical Society of America, pp. 1259-1261.
Leonhardt, U., “Optical Conforming Mapping,” www.sciencemag.org, Science, vol. 312, Jun. 23, 2006, pp. 1777-1780.
Milton, G.W. et al., “On the cloaking effects associated with anomalous localized resonance,” Proc. R. Soc. A., (Accepted Mar. 16, 2006), © 2006 The Royal Society, pp. 1-33.
Pendry, J.B. et al., “Controlling Electromagnetic Fields,” www.sciencemag.org, Science, vol. 312, Jun. 23, 2006, pp. 1780-1782.
Podolskiy, V.A. et al., “Plasmon Modes in Metal Nanowires and Left-Handed Materials,” Journal of Nonlinear Optical Physics & Materials, vol. 11, No. 1, (2002), © World Scientific Publishing Company, pp. 65-74.
Schurig, D. et al., “Metamaterial Electromagnetic Cloak at Microwave Frequencies,” Sciencexpress/ www.sciencexpress.org /Oct. 19, 2006, 8 pages.
Schwartz, B. et al., “Total external reflection from metamaterials with ultralow refractive index,” J. Opt. Soc. Am. B/vol. 20, No. 12/ Dec. 2003, © 2003 Optical Society of America, pp. 2448-2453.
Zhou, J. et al., “Saturation of the Magnetic Response of Split-Ring Resonators at Optical Frequencies,” Physical Review Letters, week ending Nov. 25, 2005, © 2005 The American Physical Society, pp. 223902-1 to 223902-4.
Dolin, L. S., “To the Possibility of Comparison of Three-Dimensional Electromagnetic Systems With Nonuniform Anisotropic Filling,” Scientific Research Radiophysical Institute of the Gorky State University, submitted to Editorial Board on Mar. 11, 1961., Izv. VUZov, Radiofizika, 1961, vol. 4, No. 5, pp. 964-967 (3 pages—English translation; 4 pages—Russian language).
Boltasseva, A., et al., “Fabrication of optical negative-index metamaterials: Recent advances and outlook,” Elsevier, Metamaterial 2, (available online Mar. 18, 2008), 17 pages.
Caloz, C., et al., “Full-wave verification of the fundamental properties of left-handed materials in waveguide configurations,” Journal of Applied Physics, vol. 90, No. 11, Dec. 1, 2001, © 2001 American Institute of Physics, pp. 5483-5486.
Huang, Y., et al., “Electromagnetic cloaking by layered structure of homogeneous isotopric materials,” Sep. 3, 2007/ vol. 15, No. 18, Optics Express, © 2007 OSA, pp. 11133-11141.
Jacob, Z., et al., “Semiclassical theory of the Hyperlens,” © 2006 Optical Society of America, 2 pages.
Momeni, B., et al., Adiabatic matching stage for coupling of light to extended Bloch modes of photonic crystals, Applied Physics Letters 87, © 2005 American Institute of Physics, pp. 171104-1/3.
Chettiar, U.K., et al., “Double Negative Index Metamaterial: Simultaneous Negative Permeability and Permittivity at 812 nm”, © 2007 Optical Society of America, 3 pages.
Kanté, B., et al., “Infrared cloaking based on the electric response of split ring resonators,” (C) 2008 OSA, Jun. 9, 2008/vol. 16, No. 12/ Optics Express, pp. 9192-9198.
Kanté, B., et al., “Experimental demonstration of a nonmagnetic metamaterial cloak at microwave frequencies,” © 2009 The American Physical Society, pp. 201104-1/201104-4.
Kopperschmidt, P., “Model of a two-dimensional photonic bicrystal,” © 2000 The American Physical Society, Physical Review B, vol. 63, pp. 045101-1-045101-6.
Pendry JB, “Metamaterials and the Control of Electromagnetic Fields,” © 2007 Optical Society of America, pp. 1-11.
Schurig, D., et al., “Calculation of material properties and ray tracing in transformation media,” (C) 2006 OSA, Oct. 16, 2006 /vol. 14, No. 21/ Optics Express, pp. 9794-9804.
Shalaev, V.M., “Optical negative-index metamaterials,” © 2007 Nature Publishing Group, nature photonics/ vol. 1/ Jan. 2007/ www.nature.com/naturephotonics, pp. 41-48.
Smolyaninov, I.I., et al., “Two-dimensional metamaterial structure exhibiting reduced visibility at 500 n.m.,” © 2008 Optical Society of America, Optics Letters/vol. 33, No. 12/ Jun. 15, 2008, pp. 1342-1344.
Valagiannopoulos, C.A., “On Measuring the Permittivity Tensor of an Anisotropic Material from the Transmission Coefficients,” Progress in Electromagnetics Research B, vol. 9, 2008, pp. 105-116.
Wang, D., et al., “Reconfigurable cloak for multiple operating frequencies,” © 2008 American Institute of Physics, Applied Physics Letters 93, (2008), pp. 043515-1/3.
Aug. 21, 2008 Non-Final Office Action, U.S. Appl. No. 11/983,228 (12264/274) 27 pages.
Sci/Tech News Staff, “Scientists Understood How to Create an Invisibility Cloak,” May 26, 2006, Softpedia.
Cook, “Scientists shed new light on invisibility,” May 29, 2006, Boston Globe.
Smolyaninov et al., “Magnifying superlens in the Visible Frequency Range,” Mar. 23, 2007, Science vol. 315, pp. 1699-1701.
Cho, “Voila!,” Oct. 20, 2006, Science, vol. 314, p. 403.
Smith et al., “Metamaterials and Negative Refractive Index,” Aug. 6, 2004, Science, vol. 305, pp. 788-792.
Duke University, “First Demonstration of a Working Invisibility Cloak,” http://www.dukenews.duke.edu/2006/10/cloakdemo._print.ht.
Pendry and Smith, “Reversing Light with Negative Refraction,” Jun. 2004, Physics Today, pp. 37-43.
Chen et al., “Electromagnetic Wave Interactions with a Metamaterial Cloak,” Aug. 10, 2007, Phys. Rev. Lett.
Gibson, “Metamaterials found to work for visible light,” Jan. 4, 2007, Ames Lab public release, EurekAlert!, http://www.eurekalert.org/pub_releases/2007-01/dl-mft010407.php?light.
Huang, “Research of Electromagnetic and Acoustic Cloaking,” Jun. 19, 2008, masters' thesis, Dept. of Optics and Photonics.
Fox, “Invisibility cloak one step closer, scientists say,” Aug. 10, 2008, cited in Aug. 21, 2008 Non-Final Office Action U.S. Appl. No. 11/983,228.
Rincon, “Experts test cloaking technology,” Oct. 19, 2006, BBC News, cited in Aug. 21, 2008 Non-Final Office Action U.S. Appl. No. 11/983,228.
Pendry et al., “Magnetism from Conductors and Enhanced Nonlinear Phenomena,” Nov. 11, 1999, vol. 47, No. 11, pp. 2075-2084.
Response to Aug. 21, 2008 Non-Final Office Action, U.S. Appl. No. 11/983,228 (12264/274), filed in the PTO on Dec. 17, 2008 (20 pages).

Jun. 17, 2009 Final Office Action, U.S. Appl. No. 11/983,228 (12264/274) 26 pages.
Canadian Military Heritage, Jun. 20, 2004, website accessed on Jun. 13, 2009 at http://www.cmhg-phmc.gc.ca/cmh/en/image_484.asp (1 page).
Purdue News, "Engineers see progress in creating invisibility cloak," Apr. 2, 2007, accessed Jun. 4, 2009 at http://www.purdue.edu/uns/x/2007a/070402ShalaevCloaking.html (5 pages).
Response to Jun. 17, 2009 Final Office Action, U.S. Appl. No. 11/983,228 (12264/274), filed in the PTO on Sep. 10, 2009 (20 pages).
Oct. 21, 2009 Non-Final Office Action, U.S. Appl. No. 11/983,228 (12264/274) 20 pages.
Response to Oct. 21, 2009 Non-Final Office Action, U.S. Appl. No. 11/983,228 (12264/274), filed in the PTO on Apr. 6, 2010, (21 pages).
Jul. 7, 2010 Final Office Action, U.S. Appl. No. 11/983,228 (12264/274) 21 pages.
N. A. P. Nicorovici, G.W. Milton, R. C. McPhedran, and L. C. Botten, "Quasistatic cloaking of two-dimensional polarizable discrete systems by anomalous resonsance," Opt. Express 15, 6314-6323 (2007).
M. G. Silveirinha, A. Alu, and N. Engheta, "Parallel-plate metamaterials for cloaking structures," Phys. Rev. B 75, 033603 (2007).
D. A. B. Miller, "On perfect cloaking," Opt. Express 14, 12457-12466 (2006).
A. Greenleaf, M. Lassas, and G. Uhlmann, "Anisotropic conductivities that cannot be detected by EIT," Physiol. Meas. 24, 413-419 (2003).
Y. Benveniste, and T. Miloh, "Neutral inhomogeneities in conduction phenomena," J. Mech. Phys. Solids 47, 1873-1892 (1999).
A. Hendi, J. Henn, and U. Leonhardt, "Ambiguities in the scattering tomography for central potentials," Phys. Rev. Lett. 97, 073902 (2006).
W. Cai, U. K. Chettiar, A. V. Kildishev, and V. M. Shalaev, "Optical cloaking with metamaterials," Nat. Photonics 1, 224-227 (2007).
R. Weder, "A rigorous analysis of high-order electromagnetic invisibility cloaks," J. Phys. A: Math. Theor. 41, 065207 (2008).
S. A. Ramakrishna, J. B. Pendry, M. C. K. Wiltshire, and W. J. Stewart, "Imaging the near field," J. Mod. Opt. 50, 1419-1430 (2003).
D. Schurig, and D. R. Smith, "Sub-diffraction imaging with compensating bilayers," New J. Phys. 7, 162 (2005).
S. M. Feng, and J. M. Elson, "Diffraction-suppressed high-resolution imaging through metallodielectric nanofilms," Opt. Express 14, 216-221 (2006).
Z. Jacob, L. V. Alekseyev, and E. Narimanov, "Optical hyperlens: Far-field imaging beyond the diffraction limit," Opt. Express 14, 8427-8256 (2006).
A. Salandrino, and N. Engheta, "Far-field subdiffraction optical microscopy using metamateral crystals: Theory and simulations," Phys. Rev. B 74, 075103 (2006).
D. E. Aspnes, "Bounds on Allowed Values of the Effective Dielectric Function of 2-Component Composites at Finite Frequencies," Phys. Rev. B. 25, 1358-1361 (1982).
D. J. Bergman, "Exactly Solvable Microscopic Geometries and Rigorous Bounds for the Complex Dielectric-Constant of a 2-Component Composite-Material," Phys. Rev. Lett. 44, 1285-1287 (1980).
G. W. Milton, "Bounds on the Complex Dielectric-Constant of a Composite-Material," Appl. Phys. Lett. 37, 300-302 (1980).
W. G. Spitzer, D. Kleinman, and D. Walsh, "Infrared Properties of Hexagonal Silicon Carbide," Phys. Rev. 113, 127-132 (1959).
D. Korobkin, Y. Urzhumov, and G. Shvets, "Enhanced near-field resolution in midinfrared using metamaterials," J. Opt. Sec. Am. B 23, 468-478 (2006).
T. Taubner, D. Korobkin, Y. Urzhumov, G. Shvets, and R. Hillenbrand, "Near-field microscopy through a SiC superlens," Science 313, 1595-1595 (2006).
J. A. Schuller, R. Zia, T. Taubner, and M. L. Brongersma, "Dielectric metamaterials based on electric and magnetic resonances of silicon carbide particles," Phys. Rev. Lett. 99, 107401 (2007).
S. O'Brien, and J. B. Pendry, "Photonic band-gap effects and magnetic activity in dielectric composites," J. Phys. Condens. Matter. 14, 4035-4044 (2002).
K. C. Huang, M. L. Povinelli, and J. D. Joannopoulos, "Negative effective permeability in polaritonic photonic crystals," Appl. Phys. Lett. 85, 543-545 (2004).
M. S. Wheeler, J. S. Aitchison, and M. Mojahedi, "Three-dimensional array of dielectric spheres with an isotropic negative permeability at infrared frequencies," Phys. Rev. B. 72, 193103 (2005).
L. Peng, L. X. Ran, H.S. Chen, H. F. Zhang, J. A. Kong, and T. M. Grzegorczyk, "Experimental observation of left-handed behavior in an array of standard dielectric resonators," Phys. Rev. Lett. 98, 157403 (2007).
Leonhardt U 2006 Notes on conformal invisibility devices *New Journal of Physics* 8 118.
Milton G W and Nicorovici N A P 2006 on the cloaking effects associated with anomalous localized resonance *Proceedings of the Royal Society a-Mathematical Physical and Engineering Sciences* 462 3027-59.
Alu A and Engheta N 2007 Cloaking and transparency for collections of particles with metamaterial and plasmonic covers *Optic Express* 15 7578-90.
Bruno O P and Lintner S 2007 Superlens-cloaking of small dielectric bodies in the quasistatic regime *Journal of Applied Physics* 102 124502.
Cai L W and Sanchez-Dehesa J 2007 Analysis of Cummer-Schurig acoustic cloaking *New Journal of Physics* 9 450.
Chen H S, Wu B I, Zhang B and Kong J A 2007 Electromagnetic wave interactions with a metamaterial cloak *Physical Review Letters* 99 063903.
Chen H Y and Chan C T 2007 Acoustic cloaking in three dimensions using acoustic metamaterials *Applied Physics Letters* 91 183518.
Greenleaf A, Kurylev Y, Lassas M and Uhlmann G 2007 Improvement of cylindrical cloaking with the SHS lining *Optics Express* 15 12717-34.
Guenneau S, Ramakrishna S A, Enoch S, Chakrabarti S, Tayeb G and Gralak B 2007 Cloaking and imaging effects in plasmonic checkerboards of negative epsilon and mu and dielectric photonic crystal checkerboards *Photonics and Nanostructure-Fundamentals and Applications* 5 63-72.
Teixeira F L 2007 Differential form approach to the analysis of electromagnetic cloaking and masking *Microwave and Optical Technology Letters* 49 2051-3.
Alitalo P, Luukkonen O. Jylha L, Venermo J and Tretyakov S A 2008 Transmission-line networks cloaking objects from electromagnetic fields *Ieee Transactions on Antennsas and Propagation* 56 416-24.
Blanchard C, Porti J, Wu B I, Morente J A, Salinas A and Kong J A 2008 Time domain simulation of electromagnetic cloaking structures with TLM method *Optics Express* 16 6461-70.
Cai W S, Chettiar U K, Kildishev A V and Shalaev V M 2008 Designs for optical cloaking with high-order transformations *Optics Express* 16 5444-52.
Gaillot D P, Croenne C and Lippens D 2008 an all-dielectric route for terahertz cloaking *Optics Express* 16 3986-92.
Jacob Z and Narimanov E E 2008 Semiclassical description of non magnetic cloaking *Optics Express* 16 4597-604.
Kohn R V, Shen H, Vogelius M S and Weinstein M I 2008 Cloaking via change of variables in electric impedance tomography *Inverse Problems* 24 015016.
Kwon D H and Werner D H 2008 Restoration of antenna parameters in scattering environments using electromagnetic cloaking *Applied Physics Letters* 92 113507.
Liang Z X, Yao P J, Sun X W and Jiang X & 2008 The physical picture and the essential elements of the dynamical process for dispersive cloaking structures *Applied Physics Letters* 92 131118.
Vanbesien O, Fabre N, Melique X and Lippens D 2008 Photonic-crystal-based cloaking device at optical wavelengths *Applied Optics* 47 1358-62.
Xiao D and Johnson H T 2008 Approximate optical cloaking in an axisymmetric silicon photonic crystal structure *Optics Letters* 33 860-2.
Zhao Y, Argyropoulos C and Hao Y 2008 Full-wave finite-difference time-domain simulation of electromagnetic cloaking structures *Optics Express* 16 6717-30.
Zharova N A, Shadrivov I V and Kivshar Y S 2008 Inside-out electromagnetic cloaking *Optics Express* 16 4615-20.

Milton G W, Briane M and Willis J R 2006 On cloaking for elasticity and physical equations with a transformation invariant form *New Journal of Physics* 8 248.
Zhang S, Genov D A, Sun C and Zhang X 2008 Cloaking of matter waves *Physical Review Letters* 100 123002.
Cheng Y, Yang F, Zu J Y and Liu X J 2008 A multilayer structured acoustic cloak with homogeneous isotropic materials *Applied Physics Letters* 92 151913.
Cummer S A, Popa B I, Schurig D, Smith D R, Pendry J, Rahm M and Starr A 2008 Scattering theory derivation of a 3D acoustic cloaking shell *Physical Review Letters* 1 024301.
Cummer S A and Schurig D 2007 One path to acoustic cloaking *New Journal of Physics* 9 45.
Kwon D H and Werner D H 2008 Two-dimensional eccentric elliptic electromagnetic cloaks *Applied Physics Letters* 92 -.
Jenkins A 2008 Optical cloaking—A many-layered solution *Nature Photonics* 2 270-.
Jiang W X, Cui T J, Yu G X, Lin X Q, Cheng Q and Chin J Y 2008 Arbitrarily elliptical-cylindrical invisible cloaking *Journal of Physics D-Applied Physics* 41 085504.
Kwon D H and Werner D H 2008 Two-dimensional electromagnetic cloak having a uniform thickness for elliptic cylindrical regions *Applied Physics Letters* 92 113502.
Rahm M, Cummer S A, Schurig D, Pendry J B and Smith D R 2008 Optical design of reflectionless complex media by finite embedded coordinate transformations *Physical Review Letters* 1 063903.
Rahm M, Schurig D, Roberts D A, Cummer S A, Smith D R and Pendry J B 2008 Design of electromagnetic cloaks and concentrators using form-variant coordinate transformations of Maxwell's equations *Photonics and Nanostructures-Fundamentals and Applications* 6 87-95.
Sipos M and Thompson B G 2008 Electrodynamics on a grid: The finite-difference time-domain method applied to optics and cloaking *American Journal of Physics* 76 464-9.
Wood J 2008 Mew metamaterial may lead to a magnetic cloak *Materials Today* 11 8-.
Yao P J, Liang Z X and Jiang X Y 2008 Limitation of the electromagnetic cloak with dispersive material *Applied Physics Letters* 92 031111.
You Y, Kattawar G W, Zhai P W and Yang P 2008 Zero-backscatter cloak for aspherical particles using a generalized DDA formalism *Optics Express* 16 2068-79.
Zhang B L, Chen H S, Wu B I and Kong J A 2008 Extraordinary surface voltage effect in the invisibility cloak with an active device inside *Physical Review Letters* 1 063904.
Zhang J J, Huangfu J T, Luo Y, Chen H S, Kong H A and Wu B I 2008 Cloak for multilayered and gradually changing media *Physical Review B* 77 035116.
Zhang P, Jin Y and He S L 2008 Cloaking an object on a dielectric half-space *Optics Express* 16 3161-6.
Kerker M 1975 Invisible Bodies *Journal of the Optical Society of America* 65 376-9.
Alu A and Engheta N 2008 Robustness in design and background variations in metamaterial/plasmonic cloaking *Radio Sciences* 43 RS4S01.
Alu A and Engheta N 2008 Multifrequency optical invisibility cloak with layered plasmonic shells *Physical Review Letters* 100 113901.
Kwon D H, Wang X, Bayraktar Z, Weiner B and Werner D H 2008 Near-infrared metamaterial films with reconfigurable transmissive/reflective properties *Optics Letters* 33 545-7.
Lax M and Nelson D F 1976 Maxwell equations in material form *Physical Review B*13 1777.
Chew W C and Weedon W H 1994 A 3d Perfectly Matched Medium from Modified Maxwells Equations with Stretched Coordinates *Microwave and Optical Technology Letters* 7 599-604.
Ward A J and Pendry J B 1996 Refraction and geometry in Maxwell's equations *Journal of Modern Optics* 43 773-93.
Ward A J and Pendry J B 1998 Calculating photonic Green's functions using a nonorthogonal finite-difference time-domain method *Physical Review B* 58 7252.
Leonhardt U and Philbin T G 2006 General relativity in electrical engineering *New Journal of Physics* 8 247.
Kildishev A V and Narimanov E E 2007 Impedance-matched hyperlens *Opt. Lett.* 32 3432-4.
Kildishev A V and Shalaev V M 2008 Engineering space for light via transformation optics *Optics Letters* 33 43-5.
Chen H Y, Liang Z X, Yao P J, Jiang X Y, Ma H R and Chan C T 2007 Extending the bandwith of electromagnetic cloaks *Physical Review B* 76 241104.
Ramakrishna S A and Pendry J B 2003 Removal of absorption and increase in resolution in a near-field lens via optical gain *Physical Review* B 67-.
Garcia de Abajo F J, Gomez-Santos G, Blanco L A, Borisov A G and Shabanov S V 2006 Tunneling mechanism of light transmission through metallic films *Physical Review Letters* 95.
Noginov M A, Zhu G, Bahoura M, Adegoke J, Small C E, Ritzo B A, Drachev V P and Shalaev V M 2006 Enhancement of surface plasmons in an Ag aggregate by optical gain in a dielectric medium *Optics Letters* 31 3022-4.
Klar T A, Kildishev A V, Drachev V O and Shalaev V M 2006 Negative-index metamaterials: Going optical *IEEE Journal of Selected Topics in Quantum Electronics* 12 1106-15.
Zhaowei L., et al., "Far-Field Optical Hyperlens Magnifying Sub-Diffraction-Limited Objects," Mar. 23, 2007 vol. 315 Science www.sciencemag.org.
Jacob, Z., et al., "Semiclassical theory of the hyperlens," J. Opt. Soc. Am A/vol. 24, No. 10/Oct. 2007, © 2007 Optical Society of America.
Xiong, Y., et al., "Two-Dimensional Imaging by Far-Field Superlens at Visible Wavelengths," Nano Letters, 2007, vol. 7, No. 11, 3360-3365, © 2007 American Chemical Society.
Zhang, X., et al., "Superlenses to overcome the diffraction limit," nature materials/ vol. 7/Jun. 2008/ www.nature.com/naturematerials, © 2008 Nature Publishing Group.
Schurig, D., et al., "Transformation-designed optical elements," © 2007 OSA, Oct. 29, 2007,/ vol. 15, No. 22/ Optics Express.
Avrutsky, I., "Guided modes in a uniaxial multilayer," J. Opt. Soc. Am A/vol. 20, No. 3/Mar. 2003, © 2003 Optical Society of America.
Elser, J., et al., "Nonlocal effects in effective-medium response of nanolayered materials," Applied Physics Letters 90, 191109 (2007), © 2007 American Institute of Physics.
Gan, L., et al., "Ray trace visualization of negative refraction of light in two-dimensional air-bridged silicon photonic crystal slabs at 1.55 um," Jun. 8, 2009/ vol. 17, No. 12/ Optics Express.
Jacob, Z., et al., Optical "Hyperlens": imaging in the far field beyond the diffraction limit, © 2006 Optical Society of America.
Kildishev, A., et al., "Materializing a binary hyperlens design," Applied Physics Letters 94, (2009).
Lee, H., et al., "Development of optical hyperlens for imaging below the diffraction limit," Nov. 26, 2007/ vol. 15, No. 24/ Optics Express.
Zhang, J. J., et al., "Directive Emission Obtained by Coordinate Transformation," Progress in Electromagnetics Research, Pier 81, 437-446, 2008.
Litchinitser, N. M., et al., "Negative refraction," Reprinted from the McGraw-Hill Yearbook of Science & Technology 2008. Copyright © 2007 by the McGraw-Hill Companies, Inc.
Litchinitser, N. M., et al., "Photonic Metamaterials," Laser Physics Letter, www.lphys.org, Laser Phys. Lett. 5, No. 6, 411-420 (2008).
Science Daily, "Invisibility Cloak and Ultra-powerful Microscopes: New Promises Radical Advances in Optical Technologies," Oct. 17, 2008, http://www.sciencedaily.com/releases/2008/10/081016141450.htm, adapted from materials provided by Purdue University.
Belov, P. A., et al., "Subwavelength imaging at optical frequencies using a transmission device formed by a periodic layered metal-dielectric structure operating in the canalization regime," Physical Review B 73, (2006), © 2006 The American Physical Society.
Office Action from U.S. Appl. No. 11/983,228, dated Jul. 7, 2010, 21 pages.
Response to Office Action for U.S. Appl. No. 11/983,228, dated Dec. 20, 2010, 23 pages.

* cited by examiner

SYSTEM, METHOD AND APPARATUS FOR MODIFYING THE VISIBILITY PROPERTIES OF AN OBJECT

This application claims the benefit priority to U.S. provisional application Ser. No. 61/103,025, filed on Oct. 6, 2008, which is incorporated herein by reference.

STATEMENT OF GOVERNMENT SUPPORT

This work was supported in part Army Research Office grant W911NF-04-1-0350 and by ARO-MURI award 50342-PH-MUR.

TECHNICAL FIELD

This application relates to a system, method and apparatus for the modification of the observability properties of an object by a structure.

BACKGROUND

An object may be made effectively invisible at least over some frequency range. This has been termed a "cloak of invisibility"; the invisibility sought may be partial at a specific frequency, or over a band of frequencies, so the term "cloak of invisibility" or "cloak" may take on a variety of meanings. The cloak may be designed to decrease scattering (particularly "backscattering") from an object contained within, while at the same time reducing the shadow cast by the object, so that the combination of the cloak and the object contained therein have a resemblance to free space. When the phrase "cloaking," "cloak of invisibility," or the like, is used herein, the effect is generally acknowledged to be imperfect, and the object may appear in a distorted or attenuated form, or the background behind the object by the object may be distorted or partially obscured.

As will be understood by a person of skill in the art a "frequency" and a "wavelength" are inversely related by the speed of light in vacuo, and either term would be understood when describing an electromagnetic signal.

In some aspects, the cloak has a superficial similarity to "stealth" technology where the objective is to make the object as invisible as possible in the reflection or backscattering direction. One means of doing this is to match the impedance of the stealth material to that of the electromagnetic wave at the boundary, but where the material is strongly attenuating to the electromagnetic waves, so that the energy backscattered from the object within the stealth material is strongly attenuated on reflection, and there is minimal electromagnetic reflection at the boundary within the design frequency range. This is typically used in evading radar detection in military applications. Shadowing may not be a consideration in stealth technology. Shadowing may be understood as the effect of the object in blocking the observation of anything behind the object, for example the background, where the object is disposed between the observer and the background. A perfect cloak would result in no shadowing.

The materials used for the cloak may have properties where, generally, the permeability and permittivity tensors are anisotropic and where the magnitudes of the permeability and permittivity are less than one, so that the phase velocity of the electromagnetic energy being bent around the cloaking region is greater than that of the group velocity.

Materials having such properties have not been discovered as natural substances, but have been produced as artificial, man-made composite materials, where the permittivity and permeability of the bulk material are less than unity, and may be negative. They are often called "metamaterials" an extension of the concept of artificial dielectrics, that were first designed in the 1940s for microwave frequencies. Such materials typically consist of periodic geometric structures of a guest material embedded in a host material.

Analogous to the circumstance where homogeneous dielectrics owe their properties to the nanometer-scale structure of atoms, metamaterials may derive their properties from the sub-wavelength structure of its component materials. At wavelengths much longer than the unit-cell size of the material, the structure can be represented by effective electromagnetic parameters that are also used describe homogeneous dielectrics, such as an electric permittivity and a refractive index.

Cloaking has been experimentally demonstrated over a narrow band of microwave frequencies by achieved by varying the dimensions of a series of split ring resonators (SRRs) to yield a desired gradient of permeability in the radial direction.

SUMMARY

A apparatus for modifying the visibility properties of an object is disclosed, including a structure formed of a metamaterial. The metamaterial properties are selected so that an electromagnetic wave incident on the apparatus is guided around the object at plurality of wavelengths.

In an aspect, a method of designing a structure for use as a cloak effective at a plurality of wavelengths, includes the steps of: selecting a design wavelength; selecting a metamaterial having the property of having a low loss at the design wavelength and at least a permeability or a permittivity of less than unity; and determining, for a selected shape and size of structure, the variation of metamaterial properties as a function of position in the structure so as to guide electromagnetic waves of the design wavelength and polarization around a object disposed within the structure. A second design wavelength is selected and the design process is repeated for the second design wavelength.

In another aspect, a method of modifying the observability of an object, includes the steps of: providing a structure fabricated from a plurality of metamaterials, the metamaterials selected so as to guide electromagnetic waves around an object at a plurality of wavelengths; and disposing the structure between an observer and the object.

DETAILED DESCRIPTION

Figure 1:
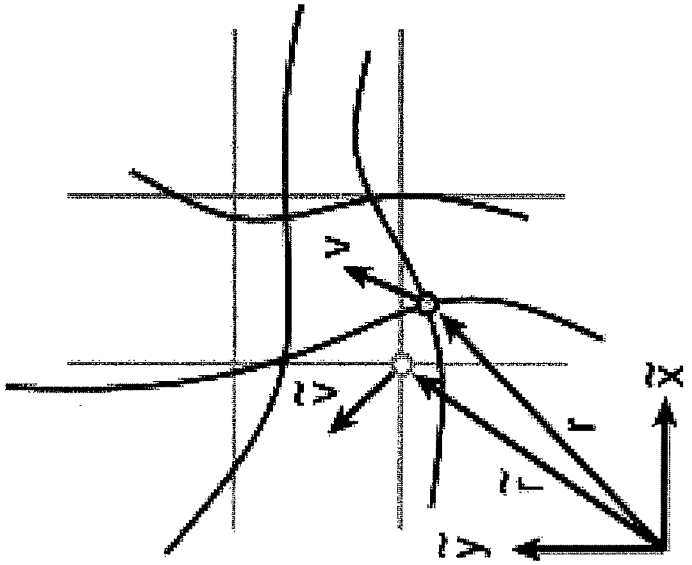
FIG. 1 is a representation of a transformation of a vector field.

Exemplary embodiments of the apparatus and method may be better understood with reference to the drawings, but these embodiments are not intended to be of a limiting nature.

When the phrase "cloaking," "cloaking structure," "cloak of invisibility" or the like is used herein, the effect may be imperfect in practice, and the object may appear in a distorted or attenuated form, or the background obscured by the object may be distorted or partially obscured or attenuated, or the perceived color of the background may be modified. Therefore, "cloak" should not be interpreted so as to require that the object within the cloak be "invisible" even at a design wavelength, nor that the background be free of shadowing or distortion. Of course, a design objective may be to approach the ideal cloak at a wavelength or a range of wavelengths. A plurality of non-contiguous wavelength ranges may also be considered in a design for a structure.

The examples disclosed herein are intended to enable a person of ordinary skill in the art to practice the inventive concepts as claimed herein, using systems, apparatus, components, or techniques that may be known, disclosed herein, or hereafter developed, or combinations thereof. Where a comparison of performance is made between the examples disclosed herein and any known system, apparatus, component, or technique, such comparison is made solely to permit a person of skill in the art to more conveniently understand the present novel system, apparatus, component, or technique, and it should be understood that, in complex systems, various configurations may exist where the comparisons made may be better, worse, or substantially the same, without implying that such results are invariably obtained or constitute a limitation on the performance which may be obtained.

Broadband cloaking of electromagnetic waves can be understood by a person of skill in the art using a simplified example of a scaling transformation of a general cylindrical coordinate system. A generalized form of the transformation equations is presented so as to permit the application of this approach to other related designs.

The apparatus design may use metamaterials with specifically engineered dispersion. Constraints on the signs of gradients in the dispersion dependencies of dielectric permittivity and magnetic permeability for different operation wavelengths may result. Some constraints may be obviated by gain-assisted compensation for losses or electromagnetically induced transparency (EIT) are included in the design of cloaking system. So, when a structure, or a portion thereof, is described as "transparent," the transparency may be at a wavelength or a range of wavelengths, and should be understood to be achievable either by low loss materials, or materials with loss that has be compensated by a gain medium.

Electromagnetically induced transparency (EIT) is a coherent nonlinear process that may occur in some highly dispersive optical systems. EIT creates a narrow transparency window within an absorption peak. The anomalous dispersion along with a low optical loss available in an EIT system may be used for broadband optical cloaking. Similarly, in a gain medium the imaginary part of the refractive index has a negative value, and the dispersion curve exhibits an anti-Lorentz line shape. This property may result in anomalous dispersion with a low loss. Examples of EIT systems are three-state lead vapors. Examples of gain media include electrically or optically pumped semiconductors, dye modules, and quantum structures.

Examples of electromagnetic wave propagation in an isotropic bi-layer or for multilayer sub-wavelength inclusions of ellipsoidal (spheroidal or spherical) shapes in a dielectric host media are presented. Other geometrical shapes may be used. Such shapes may be known geometrical shapes, portions thereof, or shapes that are composites of geometrical shapes, including shapes that are arbitrary, but slowly varying with respect to the design wavelength.

In addition to numerical and theoretical studies of composite materials described herein, broadband transparency achieved by using multiphase spherical inclusions with appropriate layered geometries and materials is described. These examples are useful for estimating local electromagnetic fields and effective optical properties of heterogeneous media with binary or multi-phase inclusions, and as the starting point for more complex designs in accordance with the concepts described herein.

The basics of transformation optics (TO) approach to designing cloaking structures described herein may follow from the fundamental theoretical results of Dolin (Dolin. L. S., Izzv. Vyssh. Uchebn. Zaved., Radiofiz. 4, 694-7, 1961) which showed that Maxwell's equations can be considered to be form-invariant under a space-deforming transformation.

The underlying theoretical basis for the transformational optics (TO) approach is presented so as to enable a person of skill in the art to generalize the examples which follow. The transformation may be used at any wavelength, but the selection of materials and geometries may depend on the specific application of the design. As such, the terms "light," "optics," and the like, are understood to be interchangeable with "electromagnetic wave" at an appropriate frequency, and not to be limited to light visible to the human eye, infrared light, or the like. Specific examples are provided at visible (to the human eye) wavelengths, and in the mid infrared, so as to illustrate the concepts presented herein.

Consider an initial material space defined by its radius-vector $\tilde{r}(\tilde{x}, \tilde{y}, \tilde{z})$ and an inhomogeneous distribution of an anisotropic material property (e.g., either anisotropic permittivity, $\epsilon$, or anisotropic permeability, $\mu$), given by a tensor, $\tilde{m}=\tilde{m}(r)$ Suppose that the initial distribution of coupled vector fields, $\tilde{v}=\tilde{v}(\tilde{r})$ and $\tilde{u}=\tilde{u}(\tilde{r})$ is modified using a tensor j. The transformation may be formally achieved by mapping the initial space, using a coordinate transformation ($r=r(\tilde{r})$, i.e. $x=x(\tilde{x},\tilde{y},\tilde{z})$, $y=y(\tilde{x},\tilde{y},\tilde{z})$, $z=z(\tilde{x},\tilde{y},\tilde{z})$) with a non-singular Jacobian matrix j, ($|j|\neq 0$), so that it is a one-to-one transformation in a neighborhood of each point. The Jacobian matrix j is arranged from the columns of base vectors, $$j=(r^{(\tilde{x})}r^{(\tilde{y})}r^{(\tilde{z})}), \quad (1)$$

or its transposition can be arranged from the columns of gradients $$j^T=(\tilde{\nabla}x\tilde{\nabla}y\tilde{\nabla}z). \quad (2)$$

In equation (1) and equation (2), $f^{(\cdot)}$ and $\tilde{\nabla}f=f^{(\tilde{x})}\hat{x}+f^{(\tilde{y})}\hat{y}+f^{(\tilde{z})}\hat{z}$ denote a partial derivative and a gradient, respectively. The Jacobian determinant $|j|$ is equal to the triple vector product, $r^{(x)}r^{(y)}r^{(z)}$. Vectors $\tilde{v}$ and $\tilde{v}$ are have scalar components, as $\tilde{v}=\tilde{v}_x\hat{x}+\tilde{v}_y\hat{y}+\tilde{v}_z\hat{z}$ and $v=v_x\hat{x}+v_y\hat{y}+v_z\hat{z}$, respectively.

Thus, a general invertible field-deforming transformation, $$\tilde{v}=j^Tv,\ \tilde{u}=j^Tu, \quad (3)$$

links the vectors of the initial vector-space $\tilde{v}=\tilde{v}(\tilde{r})$ and $\tilde{u}=\tilde{u}(\tilde{r})$ with the new vectors of a deformed vector-space $v=v(r)$ and $\tilde{u}=\tilde{u}(\tilde{r})$ obtained at the corresponding points of the new material domain.

A solution may be sought so as to achieve a given transformation of the fields in equation (3). The initial material properties, $\tilde{m}=\tilde{m}(r)$, are modified in order to obtain the required transformation of the vector fields as determined by equation (3). A formal connection between the expressions for gradients before and after the change of variables may be expressed as:

$$x=x(\tilde{x},\tilde{y},\tilde{z}),\ y=y(\tilde{x},\tilde{y},\tilde{z}),\ z=z(\tilde{x},\tilde{y},\tilde{z})$$

where $\tilde{\nabla}f(x, y, z)=f^{(x)}\tilde{\nabla}x+f^{(y)}\tilde{\nabla}y+f^{(x)}\tilde{\nabla}z$, which yields a general result that is analogous to equation (3)

$$\tilde{\nabla}=j^T\nabla. \quad (4)$$

The transformation identity for the curl can be derived first for pseudo-vectors $p=u\times v$ and $\tilde{p}=\tilde{u}\times\tilde{v}$. The standard vector algebra gives $$\tilde{u}\times\tilde{v}=(j^Tu)\times(j^Tv)=|j|j^{-1}(u\times v), \quad (5)$$

connecting pseudo-vectors p and $\tilde{p}$ through $$p=|j|^{-1}j\tilde{p}. \quad (6)$$

To obtain a formalism that is closer to Maxwell's curl equations, another product of the material tensor m and a vector u can be defined as $(mu)^{(t)}=\nabla\times v$, such that for time-independent material properties, $(mu)^{(t)}=mu^{(t)}$. This yields:

$$mu^{(t)}=\nabla\times v. \quad (7)$$

The right hand side of equation (7) is identical to $p=u\times v$, provided that vector u is replaced with $\nabla$, following the result shown in equation (4). The use of the same sets of vector components, i.e. $\nabla\times\tilde{V}=(j^Tu)\times(j^Tv)=|j|j^{-1}(\nabla\times v)$ gives $mu^{(t)}=\nabla\times v$. Finally, using $\tilde{m}=|j|j^{-1}m(j^T)^{-1}$, equation (7) can be rewritten as, $$\tilde{m}\tilde{u}^{(t)}=\tilde{\nabla}\times\tilde{v}. \quad (8)$$

Then, the required transform for tensors $\tilde{m}$ and m is given by $$m=|j|^{-1}j\tilde{m}j^T. \quad (9)$$

As shown in FIG. 1, the spatial transformation of the vector fields performed by tensor j through equation (3) can be considered as a spatial transformation $r=r(\tilde{x},\tilde{y},\tilde{z})$, with j being its Jacobian matrix, $j=(r^{(\tilde{x})}\ r^{(\tilde{y})}\ r^{(\tilde{z})})$.

For the divergence relationships in Maxwell's equations, the derivation uses a scalar product of vector v and pseudo-vector p, which gives a scalar q (i.e., $v\cdot p=q$). Then, using equation (6) the scalar products yields $\tilde{v}\cdot\tilde{p}=(j^Tv)\cdot(|j|j^{-1}p)=|j|v\cdot p)=|j|v\cdot p$, and an equivalent divergence equation is obtained through substitution of v and $\tilde{v}$ with $\nabla$ and $\tilde{\nabla}$, resulting in:

$$\tilde{\nabla}\cdot\tilde{p}=|j|\nabla\cdot p. \quad (10)$$

Equation (8) has cast the Maxwell curl equations $\nabla\times E=-\mu H^{(t)}$ and $\nabla\times H=\in E^{(t)}$ into a new set of similar equations, $\tilde{\nabla}\times\tilde{E}=-\tilde{\mu}\tilde{H}^{(t)}$ and $\tilde{\nabla}\times\tilde{H}=\tilde{\in}\tilde{E}^{(t)}$, where $$H=(j^T)^{-1}\tilde{H},\ E=(j^T)^{-1}\tilde{E}, \quad (11)$$

and $$\in=|j|^{-1}j\tilde{\in}j^T,\ \mu=|j|^{-1}j\tilde{\mu}j^T. \quad (12)$$

$(j^T)^{-1}$ in (11) is a matrix of the columns of reciprocal vectors $(j^T)^{-1}=(r^{(\tilde{y})}\times r^{(\tilde{z})}\ r^{(\tilde{z})}\times r^{(\tilde{x})}\ r^{(\tilde{x})}\times r^{(\tilde{y})})|j|^{-1}$.

Thus, provided that the electromagnetic properties of the new material space follow equation (12), the Poynting vector in the new space, $$S=\frac{1}{2}(E\times H^*),$$

will obey equation (6), satisfying the following transformation of the initial Poynting vector $$\tilde{S}=\frac{1}{2}(\tilde{E}\times\tilde{H}^*)$$

$$S=|j|^{-1}j\tilde{S}. \quad (13)$$

An analogous result would also be valid for other pseudo-vectors, e.g., the time derivatives of magnetic flux densities $B^{(t)}$ and $\tilde{B}^{(t)}$, and displacement currents, $D^{(t)}$ and $\tilde{D}^{(t)}$.

In a similar way, the divergence equations $\tilde{\nabla}\cdot\tilde{D}=\tilde{q}$ and $\nabla\cdot D=q$ would link the charge densities through equation (10) as $$q=|j|^{-1}\tilde{q}. \quad (14)$$

The above conversions provide a method of designing a continuous material space for a required spatial transformation of electromagnetic vectors and, therefore, achieving a desired functionality. That is, for the physical Poynting vector, S, to match the required transformation of the Poynting vector, $S=|j|^{-1}j\tilde{S}$, the material properties in the new space, $r=r(\tilde{r})$, should satisfy $\in=|j|^{-1}j\tilde{\in}j^T$ and $\mu=|j|^{-1}j\tilde{\mu}j^T$.

The result of Dolin is repeated here as equation (15), as the original work is in Russian and not readily available. The radially anisotropic permeability and permittivity of a spherical material inhomogeneity may be expressed as:

$$\|\varepsilon_{ik}\|=\|\mu_{ik}\|=\begin{vmatrix}\frac{R^2}{r^2(R)}\frac{dr(R)}{d(R)} & 0 & 0\\ 0 & \frac{1}{dr(R)/dR} & 0\\ 0 & 0 & \frac{1}{dr(R)/dR}\end{vmatrix}, \quad (15)$$

corresponding to a spatial transformation from the spherical coordinates r, Q, j to the coordinates R (r), Q, j . A plane wave incident from infinity on an inhomogeneity with parameters in accordance with equation (15) would pass through the inhomogeneity without apparent distortion to the external observer.

A method is described herein for the design of broadband cloaking apparatus and systems comprising binary or multiphase metamaterials, where different optical paths are arranged for different wavelengths inside the macroscopic cloaking structures. The cloaking design requirements may be satisfied through appropriate dispersion engineering of metamaterials.

The concept of an electromagnetic cloak is to create a structure, whose permittivity and permeability distributions allow the incident waves to be directed around the inner region and be (at least ideally) emitted on the far side of the structure without distortion arising from propagating through the structure. From among simple geometries, including spherical, square and elliptical varieties, cloaking in a cylindrical system is may be the most straightforward to describe mathematically, and is used for the examples herein. However, solutions in other than cylindrical coordinate systems arise from the general transformational optics theory presented herein. A person of skill in the art would understand that such structures may not need to be solved analytically, as numerical analysis methods may be effectively used. Such numerical analysis techniques may also be used for more complex structures. For some scale sizes, ray tracing in an inhomogeneous anisotropic medium may be used. For numerical analysis of cloaking devices, there are a variety of numerical electromagnetic approaches that can be used, such as the finite-element methods (FEM), the finite-difference time-domain (FDTD) methods, the finite integration technique (FIT), and the method of moments (MoM). A number of commercial packages are widely, including COMSOL MULTIPHYSICS, CST MICROWAVE STUDIO, RSoft FULLWAVE, and others may be used to perform the numerical analysis and design.

A class of a general orthogonal cylindrical coordinate system (OCCS) can be arranged by translating an x-y-plane map ($x=x(\tilde{\nu}, \tilde{\tau})$, $y=y(\tilde{\nu}, \tilde{\tau})$) perpendicular to itself; the resulting physical coordinate system forms families of concentric cylindrical surfaces. Since the unit vectors are orthogonal, $\hat{e}\times\hat{e}=\hat{e}_{\tilde{z}}$, $\hat{e}\times\hat{e}_{\tilde{z}}=\hat{e}$, and $\hat{e}_{\tilde{z}}\times\hat{e}=\hat{e}$, the complexity of TO problems in TE or TM formulations can be significantly reduced.

Consider the initial OCCS, where a 2D radius-vector is defined by a parametric vector function $\tilde{r}(\tilde{\nu}, \tilde{\tau})$, and a 2D vector $\tilde{\mu}$ is defined as $\tilde{u}=\tilde{v}\hat{e}+\tilde{v}\hat{e}$. The Jacobian matrix is the diagonal matrix, s%=diag($s_{1\%}s_{1\%}$), with the metric coefficients $\tilde{s}$=diag(s,s) and $s=\sqrt{\tilde{r}^{(\tilde{\nu})}\cdot\tilde{r}^{(\tilde{\nu})}}$. Then, the following scalar wave equation may be obtained from the Maxwell curl equations in an orthogonal cylindrical basis for a general anisotropic media. Thus, from $$\tilde{u}=\omega^{-1}\tilde{m}^{-1}\tilde{s}^{-1}\tilde{\nu}^{(\tilde{\tau})},\ \tilde{u}=-\omega^{-1}\tilde{m}^{-1}\tilde{s}^{-1}\tilde{\nu}^{(\tilde{\nu})},\ -\omega\tilde{m}_z\tilde{\nu}=|\tilde{s}|^{-1}[(\tilde{s}\tilde{u})^{(\tilde{\nu})}-(\tilde{s}\tilde{u})^{(\tilde{\tau})}], \quad (16)$$

we arrive at $$(\tilde{s}\tilde{m}^{-1}\tilde{s}^{-1}\tilde{\nu}^{(\tilde{\nu})(\tilde{\nu})}+(\tilde{s}\tilde{m}^{-1}\tilde{s}^{-1}\tilde{\nu}^{(\tilde{\tau})})^{(\tilde{\tau})}-\omega^2\tilde{m}_z|s|\nu=0, \quad (17)$$

where m̃ and m̃ are the only components of a diagonal material property tensor, i.e., anisotropic permeability or anisotropic permittivity (for TM or TE polarization respectively); the scalar $\tilde{\nu}$ is the only component of the , transverse field: i.e., the magnetic field, $H=\hat{e}_xH_z$ (TM), or the electric field, $E=\hat{e}_zE_z$ (TE).

Similar to equation (17), another wave equation in a new physical OCCS, (ν, τ, z), can be written as $$(s_\tau m_r^{-1}s_\nu^{-1}\nu^{(\nu)})^{(\nu)}+(s_\nu m_\nu^{-1}s_\tau^{-1}\nu^{(\tau)})^{(\tau)}-\omega^2 m_z|s|\nu=0 \quad (18)$$

To mimic the behaviour of light waves obeying equation (16), a scaling transformation $\nu=\nu(\tilde{\nu})$ (with $\tau=\tilde{\tau}$, $z=\tilde{z}$, and $\nu^1=\nu^{(\tilde{\nu})}$) is introduced. Thus, to get closer to equations (16), equations (18) are expressed as $$\left(\left[\frac{1}{\nu'}\frac{s_T\tilde{m}_{\tilde{T}}\tilde{s}_{\tilde{\nu}}}{\tilde{s}_{\tilde{T}}m_Ts_\nu}\right]\frac{\tilde{s}_{\tilde{T}}}{\tilde{m}_{\tilde{T}}\tilde{s}_{\tilde{\nu}}}\nu^{(\tilde{\nu})}\right)^{(\tilde{\nu})}+\left(\left[\nu'\frac{s_\nu\tilde{m}_{\tilde{\nu}}\tilde{s}_T}{\tilde{s}_\nu m_\nu s_T}\right]\frac{\tilde{s}_\nu}{\tilde{m}_\nu\tilde{s}_T}\nu^{(\tilde{T})}\right)^{(\tilde{T})}-w^2\left(\nu'\frac{m_z|s|}{\tilde{m}_z|\tilde{s}|}\right)\tilde{m}_z|\tilde{s}|\nu=0.. \quad (19)$$

It follows that equation (19) is may be made to be the same as equation (16), provided that the ratios in the square brackets can be eliminated. Thus, the TO identities $$\frac{1}{\nu'}\frac{s_T\tilde{m}_{\tilde{T}}\tilde{s}_{\tilde{\nu}}}{\tilde{s}_{\tilde{T}}m_Ts_\nu}=1,\ \nu'\frac{s_\nu\tilde{m}_{\tilde{\nu}}\tilde{s}_T}{\tilde{s}_\nu m_\nu s_T}=1,\ \nu'=\frac{m_z|s|}{\tilde{m}_z|\tilde{s}|}=1, \quad (20)$$

should be valid in a new material space ($m_\nu$, $m_\tau$, and $m_z$) in order to mimic the behaviour of light in the initial material space (m̃, m̃, and $\tilde{m}_z$). The above identities define the material transformation requirements which may be used for cloaking design and other applications.

Figure 2:
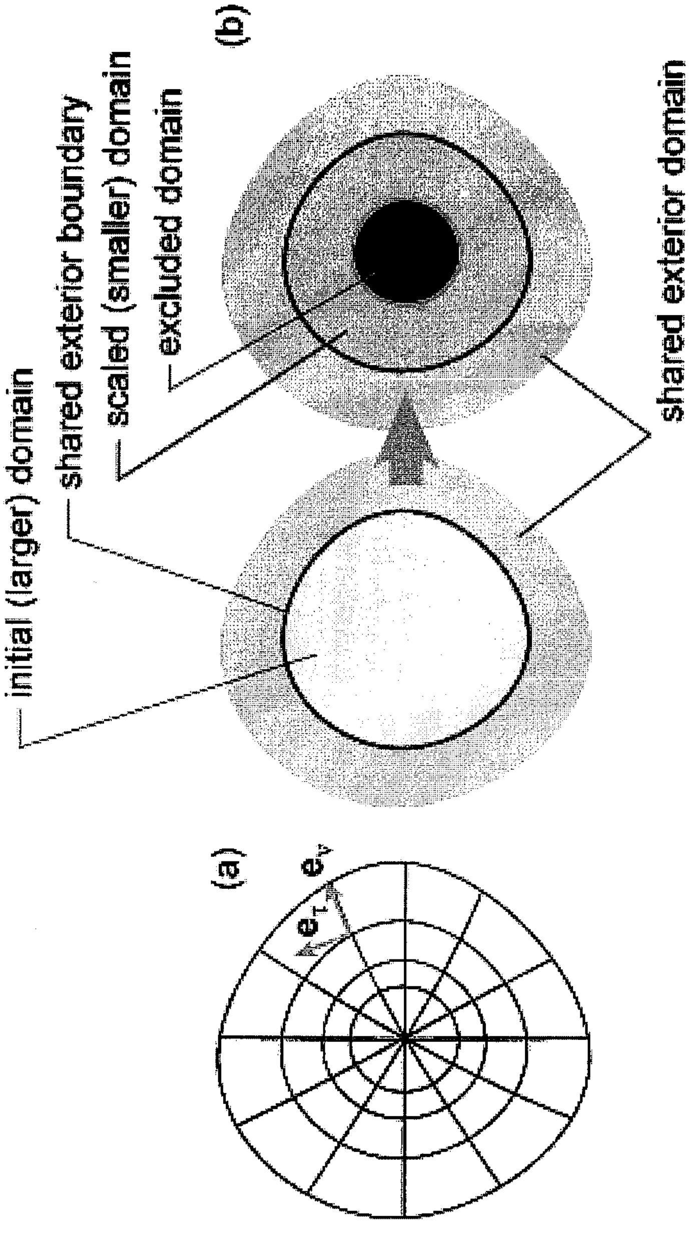
FIG. 2 is (a) an example of a general orthogonal cylindrical coordinate system; and, (b) a domain transformation for a cylindrical cloaking device where the larger initial domain in the left panel is mapped onto a scaled smaller annular domain shown in the right panel, leaving the central domain inaccessible to light; the initial and scaled domains share the same exterior boundary and the common space beyond.

Equations (20) are a solution to the problem of designing an anisotropic continuous material space supporting a required electromagnetic wave behavior, which is equivalent to the behavior of the electromagnetic waves mapped back onto the initial space. Scaling transformations that expand the initially small domain onto a larger physical domain are pertinent to imaging or light concentration while a typical cloaking application uses scaling transforms that shrink the initially larger space to produce voids excluded from the initial domain. Such voids are therefore inaccessible to electromagnetic waves at least the design frequency. The initial virtual space shares a common exterior boundary with the rest of the transformed physical world. An example is shown in FIG. 2.

In the circular cylindrical coordinates ($\nu=\rho$, $\tau=\phi$), and $s_\rho=1$, $s_\phi=\rho$, equations (20) give $$m_\phi=\frac{\rho}{\rho'\tilde{\rho}}\tilde{m}_\phi,\ m_\rho=\frac{\rho'\tilde{\rho}}{\rho}\tilde{m}_\rho,\ m_z=\frac{\tilde{\rho}}{\rho\rho'}\tilde{m}_z, \quad (21)$$

which are the material space parameters for an exact cloak, which is analogous to a cylindrical free-space domain, and is defined by the following inhomogeneous and anisotropic material properties:

$$\in_\rho=\mu_\rho=\tilde{\rho}\rho^1/\rho;\ \in_\phi=\mu_\phi=\in_\rho^{-1};\ \in_z=\mu_z=\tilde{\rho}/(\rho^1\rho). \quad (22)$$

The constraints on the material properties may be relaxed in some circumstances. For example, for TM polarization with the magnetic field polarized along the z-axis, multiply $\in^\tau$ and $\in_\phi$ by $\mu_z$ in equation (22) to obtain the following reduced set of non-magnetic cloak parameters:

$$\in_\rho=(\tilde{\rho}/\rho)^2;\ \in_\phi=(\rho^1)^{-2};\ \mu_z=1. \quad (23)$$

Similarly, for the TE polarization, the required parameters for a general transformation are:

$$\mu_\rho=(\tilde{\rho}/\rho)^2(\rho^1)^2,\ \mu_\phi=1,\ \in_z=(\rho^1)^{-2}. \quad (24)$$

In equations (22)-(24), $\tilde{\rho}$ could be replaced by $\tilde{\rho}=\tilde{\rho}(\rho)$ to obtain closed-form expressions. Such closed form expressions are useful to verify numerical analysis results for a corresponding geometrical configuration. The numerical analysis may then be extended to situations where the geometry of the apparatus or the complexity of the material spatial variations may make a closed-form solution impractical as a design tool. A person of skill in the art would use the numerical analysis methods so as to extend the scope of the types of apparatus, materials and wavelength regimes which may be used in designs based on the theoretical analysis presented herein.

Consider the bandwidth of a cloaking structure when a design for a single specific central wavelength is used. A broadband cloak may be designed to function in a wavelength multiplexing manner. Since the anisotropic constituent materials of a cloak for one wavelength may not be transparent at other frequencies, cloaks for the wavelengths being considered should share the same outer boundary, may be is the physical outer boundary of the device. The inner boundary and the transformation for each operating wavelength is dependent on the wavelength. Thus, a number of different inner boundaries and different transformations may be used to provide a broadband cloaking capability.

In practice, the registration of the outer boundaries of the different material layers may have some variation without appreciable degeneration of the overall effectiveness of the broadband guidance. This follows from simulations which have suggested that variations from the ideal material parameter profile may be tolerated.

Moreover, as the theoretical results here and elsewhere in the description herein are obtained from analytic models, some adjustment of the results may be needed in practice to, for example, take account of the refraction of a signal of a wavelength that differs from the design wavelength, or which passes through a shell of another design wavelength prior to being refracted by a shell designed for the signal. In another aspect, while gain media may be needed in some cases for an exact cloaking result, some loss may be tolerated in the structure, depending on the application, and the sensitivity of the viewer or viewing device to changes in the strength of the background signal, the transmitted signal or the like.

Figure 3:
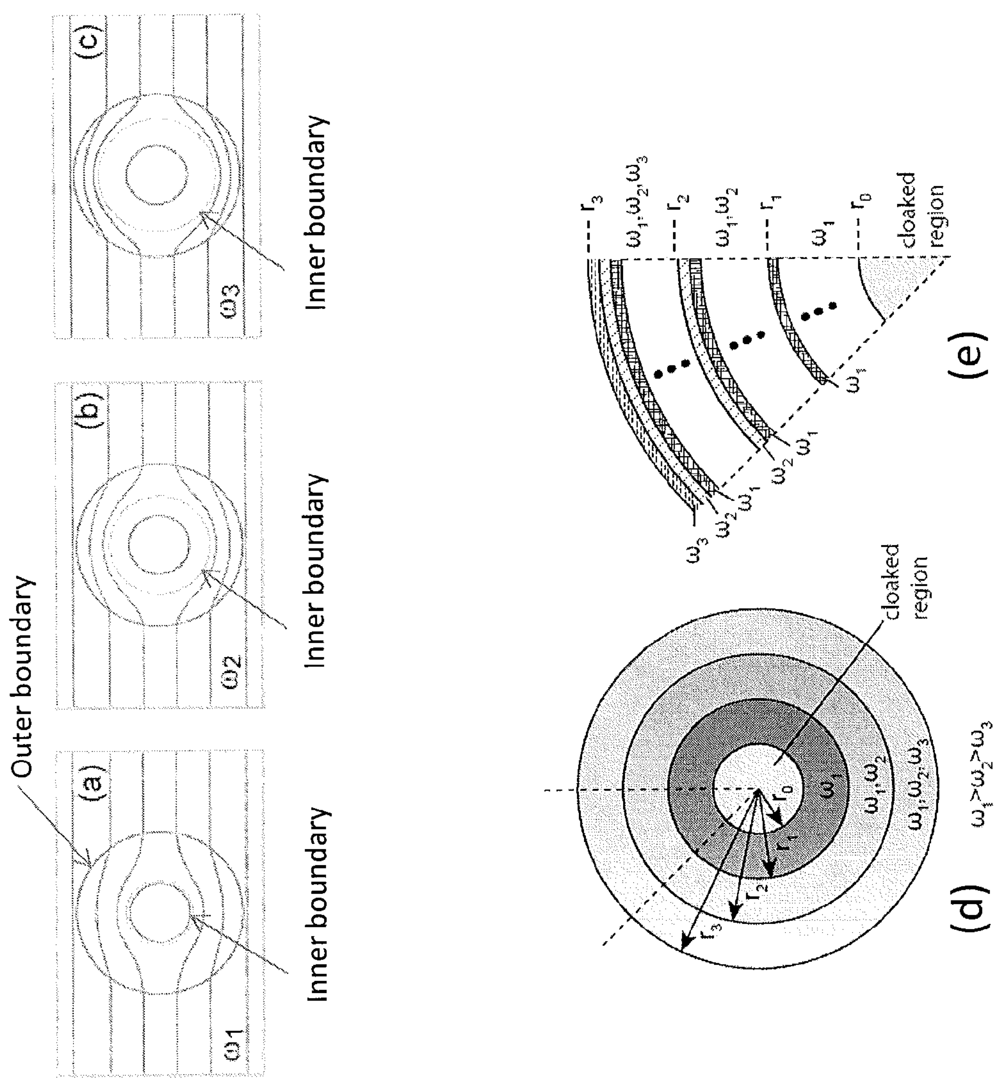
FIG. 3 is a schematic representation of a cloaking system for multiple wavelengths or a finite bandwidth, with w1 >w2 >w3 , shown in (a), (b), and (c) respectively; the ray paths of the respective wavelengths are shown where the outer and inner circles represent the physical boundaries of the cloaking device, and the circles between the two refer to an inner material boundary for a design wavelength; the wavelengths of the electromagnetic waves that may propagate in the annular regions are indicated in (d); and, an example of the arrangement of materials within each annular region is shown in (e) where the layers and sub-layers of metamaterials appropriate for the wavelengths propagating in each of the annular regions are shown.

FIG. 3 is a schematic representation of a cloaking system for multiple wavelengths or a finite bandwidth, with $w_1>w_2>w_3$, shown in (a), (b), and (c) respectively; the outer and inner circles represent the physical boundaries the cloaking device, and the circle between the two refers to an inner material boundary for each design wavelength;.

Since the wave components at different frequencies go through the system following different physical paths, the proposed system may permit the cloaking parameters to be appropriately realized over a finite bandwidth without violating basic physical laws or giving rise to a superluminal group velocity. As a result, a ‘colorful’ (multi-frequency) image would appear transparently through the cloaking device. At the central wavelength of each of the various designs, an image of the background region behind the cloaking structure in the design wavelength (“color”) would be seen. This would be the situation for each of the design wavelengths of the structure.

The device may be constructed using multiple shells of material, where the material properties of each shell is appropriate for the wavelengths propagating therein. Further, it would be understood that each shell may also be comprised of a number of conformal shells with material properties that vary with a geometric dimension such as the radius. Such a construction may facilitate the manufacturing process. Further, although not shown, some shells may be a gain material, or dielectric materials or various types of materials may be fabricated as a composite material.

In order to better understand the limitations on cloaking over a contiguous band of frequencies, consider the TE propagation mode with material properties given in equation (24), which allows for flexible parameters at the outer boundary of $\rho=b$. Assume that at frequency $\omega_0$, the material properties required by a TE cloak are exactly satisfied based on the transformation $\rho=\rho(\tilde{\rho})$ within the range, $\alpha\leqq\rho\leqq b$;

$$\mu_\rho(\omega_0,\rho)=(\tilde{\rho}/\rho)^2(\rho^1)^2,\ \mu_\phi(\omega_0,\rho)=1,\ \in_z(\omega_0,\rho)=(\rho^1)^{-2}. \tag{25}$$

Dispersion needs to be considered for broadband performance of a cloaking system. Assuming that the cloaking materials exhibit a linear dispersion around the initial frequency $\omega_0$ the dispersion function may be expressed in a Taylor series expansion:

$$\mu_\rho(\omega,\rho)=\mu_\rho(\omega_0,\rho)+\mu_\rho^{(\omega)}(\omega_0,\rho)(\omega-\omega_0), \tag{26}$$

and $$\in_z(\omega,\rho)=\in_z(\omega_0,\rho)+\in_z^{(\omega)}(\omega_0,\rho)(\omega-\omega_0), \tag{27}$$

In equations (26) and (27) the two frequency derivatives $\mu_\rho^{(\omega)}$ and $\in_z^{(\omega)}$ are continuous functions of $\rho$. Since there is no magnetic response along the $\phi$ direction at $\omega_0$, it may be reasonable to choose that $\mu_\phi(\omega,\tau)=\mu_\phi(\omega_0,\tau)=1$.

The initial formulation of the analysis is to determine, at a frequency $\omega_1=\omega_0+\delta\omega$, a combination of the transformation $\rho_1=\rho_1(\tilde{\rho})$ along with yet another inner radius $a_1$ such that the function $\rho_1(\tilde{\rho})$ maps [0, b] onto [$a_1$, b] with $a<a_1<b$, while satisfying the boundary conditions $$\rho_1(0)=a_1\rho_1(b)=b \tag{28}$$

along with the monotonicity condition:

$$\rho_1^1>0 \tag{29}$$

and, the material transforms of the reduced TE cloak:

$$\mu_\rho(\omega_1,\rho_1)=(\tilde{\rho}/\rho_1)^2(\rho_1^1)^2,\ \in_z(\omega_1,\rho_1)=(\rho_1^1)^{-2} \tag{30}$$

where $\tilde{\rho}=g_1^{-1}(\rho)$, $a_1\leqq\rho\leqq b$.

The transformation $\rho_1(\tilde{\rho})$ for $\omega_1=\omega_0+\delta\omega$ is related to the original transformation at $\omega_0$ and the dispersion functions by:

$$(\tilde{\rho}(\rho_1)/\rho_1)^2(\rho_1^1)^2=(\tilde{\rho}(\rho)/\rho)^2(\rho^1)^2+\mu_\rho^{(\omega)}(\omega_0,\rho)(\omega-\omega_0), \tag{31}$$

and $$(\rho_1^1)^{-2}=(\rho^1)^{-2}+\in_z^{(\omega)}(\omega_0,\rho)(\omega-\omega_0), \tag{32}$$

within the range of $a_1\leqq\rho_1\leqq b$ with the boundary conditions mentioned above. It would appear that equations (31) and (32) may not be fulfilled exactly for arbitrary gradients of dispersion functions $\mu_\rho^{(\omega)}(\omega_0,\rho)$ and $\in_z^{(\omega)}(\omega_0,\rho)$.

Therefore, achieving complete cloaking over a bandwidth involves computational methods and materials for dispersion management. This requirement may be expressed as: What physically-possible functions $\mu_\rho^{(\omega)}(\omega_0,\rho)$ and $\mu_\rho^{(\omega)}(\omega_0,\rho)$ should be engineered to make the cloaking effect possible at a given frequency $\omega_1=\omega_0+\delta\omega$ in addition to cloaking at $\omega_0$?

After some algebra, it may be seen that equations (28) to (32) can be satisfied by $$\mu_\rho^{(\omega)}(\omega_0,\rho)\in_z^{(\omega)}(\omega_0,\rho)<0. \tag{33}$$

That is, equation (33) indicates that the dispersion of the radial permeability $\mu_\rho(\omega,\rho)$ and the axial permittivity $\in_z(\omega,\rho)$ should have opposite slopes as functions of the frequency.

The effective bandwidth of a transformation-based cloaking device is determined by the frequency range over which the material properties in equations (22)-(24) are substantially satisfied. The curved trajectory of the electromagnetic waves within the cloak implies a refractive index n of less than 1 in order to satisfy the minimal optical path requirement of the Fermat principle. However, a metamaterial with n<1 should be dispersive to fulfill causality.

In practice, the bandwidth of the apparatus may largely be determined by the performance tolerances. That is, how close to the performance of an ideal cloak over a bandwidth is achieved. The needed performance may be dependent on the application for which the structure is intended. So, while mathematically there may be a single wavelength value where the cloaking conditions are exactly fulfilled, the undesired scattering and distortion arising from the cloak structure may remain at a low level over a finite bandwidth. As such, cloaks share the property of many engineering solutions in that compromises in performance may be accepted as a trade-off with respect to cost, complexity, and the like.

Specifically engineered strong anomalous dispersion may be needed as equation (33) is not satisfied with normal dispersion, where $\partial\in(\omega)/\partial\omega>0$ and $\partial\mu(\omega)/\partial\omega>0$. However, anomalous dispersion characteristics are normally associated with substantial loss. In such designs, a broadband cloaking solution may need additional loss-compensation by incorporating gain media in the structure.

Passive materials exhibit normal dispersion away from the resonance band. Because anomalous dispersion usually occurs only around the absorption bands, a wavelength multiplexing cloak with broadband capability may be achievable when gain materials or electromagnetically induced transparency or chirality are introduced to make low-loss anomalous dispersion possible. For example, in an active medium, where the optical gain is represented by a negative imaginary part of permittivity over a finite bandwidth, the real part of permittivity around the active band will exhibit an anti-Lorentz line shape, as governed by the Kramers-Kronig relations. As a result, anomalous dispersion with relatively low loss can occur in the wings of the gain spectrum. Incorporating gain materials into plasmonics and metamaterials has been proposed and demonstrated in related applications such as, a near-field superlens, tunneling transmittance, enhanced surface plasmons, and lossless negative-index materials.

We present two structures for optical cloaking based on high-order transformations for TM and TE polarizations respectively. These designs are realizable for at least visible and infrared light wavelengths.

The constitutive dimensional and electromagnetic parameters of the cloak are determined by the specific form of the spatial transformation used. The parameters are usually anisotropic with gradient requirements that may be achieved using artificially engineered structures Two design examples of optical cloaks based on high-order transformations are described. Specifically: i) a non-magnetic cylindrical cloaking system for TM incidence (magnetic field polarized along the cylindrical axis) which consists of a layered metal-dielectric without any variation in either material or structure along the vertical direction; and, ii) a magnetic cylindrical cloak for TE incidence (electric field polarized parallel to axis) utilizing Mie resonance in periodic rod-shaped high-permittivity materials.

For a cloak in the cylindrical geometry, a coordinate transformation function $r=g(r^1)$ from $(r^1, \theta^1, z^1)$ to $(r, \theta, z)$ is used to compress the region $r^1 \leqq b$ into a concentric shell of $a \leqq r \leqq b$, and the permittivity and permeability tensors required for an exact cloak can be determined as:

$$\in_r=\mu_r=(r^1/r)\partial g(r^1)\partial r^1;\ \in_\theta=\mu_\theta=1/\in_r;\ \in_z=\mu_z=(r^1/r)[\partial g(r^1)/\partial r^1]^{-1} \quad (34)$$

For the standard states of incident polarization, the requirement of equation (34) can be relaxed such that only three of the six components are relevant. For example, for TE (TM) polarization, only $\mu_z$, $\mu_r$ and $\mu_\theta$($\mu_z$, $\in_r$ and $\in_\theta$) enter into Maxwell's equations. As would be understood, the TM and the text in parenthesis are read in lieu of the TE and corresponding parameters so as to provide a compact presentation of the discussion The parameters can be further simplified to form reduced parameters which are more realistic for practical applications. Since the trajectory of the waves is determined by the cross product components of the $\in$ and $\mu$ tensors instead of the two tensors individually, the cloaking performance is sustained as long as $n_\theta=\sqrt{\in_z\mu_r}$ and $n_r=\sqrt{\in_s\mu_\theta}$ ($n_0=\sqrt{\mu_z\in_r}$ and $n_r=\sqrt{\mu_z\in_\theta}$) meet equation (34). This technique results in a specific set of reduced parameters which allow for a permeability gradient along only the radial direction for the TE mode:

$$\mu_r=(r^1/r)^2[\partial g(r^1)/\partial r^1]^2;\ \mu_\theta=1;\ \in_z=[\partial g(r^1)/\partial r^1]^{-2} \quad (35)$$

and can be purely non-magnetic for the TM mode:

$$\in_r=(r^1/r)^2;\ \in_\theta=[\partial g(r^1)/\partial r^1]^{-2};\ \mu_z=1 \quad (36)$$

The designs of the example electromagnetic cloaks herein use known structures and materials to achieve the set of parameters corresponding to any of equations (34)-(36). Recently a demonstration of a microwave cloak satisfying equation (35) was reported and the previously described non-magnetic optical cloak in U.S. patent application Ser. No. 11/983,228, filed on Nov. 7, 2007, and is incorporated herein by reference, corresponds to the case described by equation (36). One common aspect in the previous work is that the designs were based on a standard linear transformation $r=g(r^1)=(1-a/b)r^1+a$.

Designs based on more general high-order transformations are described. In particular, for the TM polarization, a non-magnetic cloak design which may compatible with mature fabrication techniques such as direct deposition and direct etching is described; for TE incidence, a structure that allows for a radial gradient in the magnetic permeability while avoiding the use of plasmonic metallic inclusions in the optical range is described.

Consider a non-magnetic cloak for the TM mode with parameters given in equation (36). In this case, the cloak material is designed to produce the required gradients in $\in_r$ and $\in_\theta$ using readily available materials. In an aspect, the design may employ the flexibility in realizing the effective permittivity of a general two-phase composite medium.

When an external field interacts with a composite material comprising two elements with permittivity of $\in_1$ and $\in_2$ respectively, minimal screening occurs when all internal boundaries between the two constituents are parallel to the electric field, and maximal screening occurs when all boundaries are aligned perpendicular to the field. These two extremes of orientation can be achieved by using an alternating layered structure, provided that the thickness of each layer is much less than the wavelength of the incident electromagnetic radiation. The two extreme values of the effective permittivity can be approximated as:

$$\in_\parallel=f\in_1+(1-f)\in_2;\ \in_\perp=\in_1\in_2/(f\in_2+(1-f)\in_1) \quad (37a, b)$$

where $f$ and $1-f$ denote the volume fractions of components 1 and 2, and the subscripts $\parallel$ and $\perp$ indicate the cases with electric field polarized parallel and perpendicular to the interfaces of the layers, respectively. Such layered structures have been studied extensively in recent years for various purposes, especially in sub-diffraction imaging for both the near field and the far zone.

The alternating layers may be a plurality of layers, each layer having a bulk material property appropriate to a particular wavelength and the shape of the cloaking structure being designed, and some of these layers may be, for example gain media so as to compensate for the loss in passive layers.

The two extrema in equation (4) are termed the Wiener bounds on the permittivity, which set the bounds on the effective permittivity of a two-phase composite material. Other limits, for example those from the spectral representation developed by Bergman and Milton (see Bergman, D. J., Phys. Rev. Lett. 44, 1285-1287, 1980; Milton, G. W., Appl. Phys. Lett. 37 , 300-302, 1980) may also apply in addition to the Wiener bounds, but equation (37) nonetheless provides a straightforward way to evaluate the accessible permittivity range in a composite with specified constituent materials. The Wiener bounds can be illustrated on a complex $\in$-plane with the real and imaginary parts of $\in$ being the x and y axis, respectively. In this plane, the low-screening bound in equation (37a) corresponds to a straight line between $\in_1$ and $\in_2$, and the high-screening bound in equation (4b) defines an arc which is part of the circle determined by the three points: $\in_1$, $\in_2$ and the origin.

The material properties for the cloak design corresponding to equation (36) are such that, for a non-magnetic cylindrical cloak with any transformation function, $\in_r$ varies from 0 at the inner boundary of the cloak (r=a) to 1 at the outer surface (r=b), while $\in_\theta$ is a function of r with varying positive value, except for the linear transformation case where $\partial g(r^1)/\partial r^1$ is a constant.

Fulfilling the parameters in equation (36) may use, for example, alternating metal-dielectric slices whose properties may be estimated by equation (37). Phase 1 is a metal ($\in_1=\in_m<0$) and phase 2 is a dielectric ($\in_2=\in_d>0$), and the desired material properties of the cloak are achieved when the slices are within the r-z plane of the cylindrical coordinates. $\in_r$ and $\in_\theta$ correspond to $\in_\parallel$ and $\in_\perp$ in equation (37), respectively.

Figure 4:
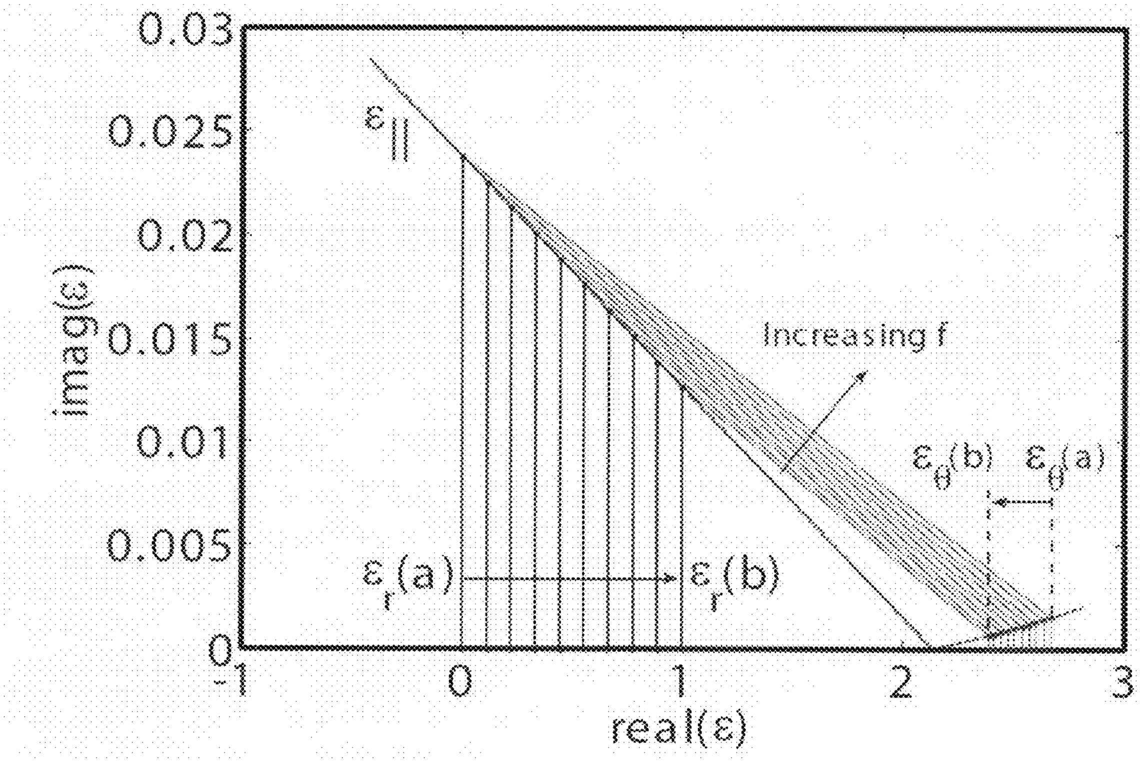
FIG. 4 shows design constraints for constructing a non-magnetic cloak in the TM mode with high-order transformations; the thick solid and dashed lines represent the two Wiener bounds $\epsilon_{\|}(f)$ and $\epsilon_{\perp}(f)$, respectively: the basic material properties for this calculation are: $\epsilon_1=\epsilon_{Ag}=-10.6+0.14i$ and $\epsilon_2=\epsilon_{SiO2}=2.13$ at $\lambda=532$ nm.

This situation is illustrated in FIG. 4. The thick solid and dashed lines represent the two Wiener bounds $\in_\parallel(f)$ and $\in_\perp(f)$, respectively. The constituent materials used for the calculation presented in FIG. 4 are silver and silica at a "green" light wavelength of 532 nm. The pair of points on the bounds with the same filling fraction are connected with a straight line for clarity. When $\in_r$ varies between 0 and 1, the value of $\in_\theta$ varies accordingly as shown by the arrow between the two thin dashed lines. Therefore, the construction of a non-magnetic cloak establishes the relationship between the two quantities $\in_\parallel$ and $\in_\perp$ (as functions of $f$) within the range shown in FIG. 4 that fits the material properties given in equation 36 for a particular transformation function: $r=g(r^1)$.

Figure 5:
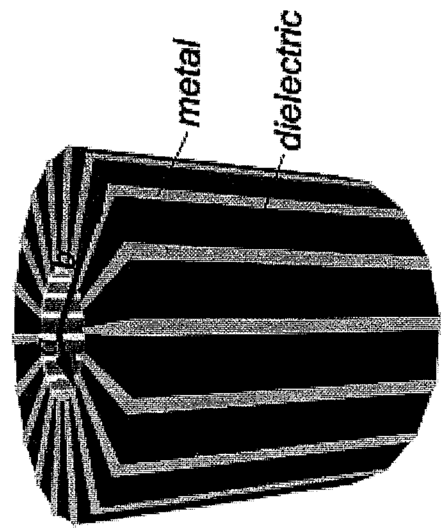
FIG. 5 is a perspective view of a cylindrical non-magnetic cloak using the high-order transformations for TM polarization.

The example design has a low loss factor. As shown in FIG. 4, the loss factor described by the imaginary part of the effective permittivity is on the order of 0.01. This is considerably smaller than that of a pure metal or any resonant metal-dielectric structures. A schematic representation of the structure having interlaced metal and dielectric slices is illustrated in FIG. 5.

For a selected design wavelength, a transformation together with the cylindrical shape factor a/b that fulfills the following equation may be suitable.

$$\varepsilon_m \varepsilon_d \left(\frac{\partial g(r')}{\partial r'}\right)^2 + \left(\frac{r'}{g(r')}\right)^2 - \varepsilon_m + \varepsilon_d = 0 \quad (38)$$

and $$g(0)=a;\ g(b)=b;\ \partial g(r^1)/\partial r^1>0 \quad (39)$$

An approximate solution to the equations may be found using a polynomial function such as:

$$r=g(r^1)=[1-a/b+p(r^1-b)]r^1+a \quad (40)$$

$$|p|<(b-a)/b^2$$

with

Such a quadratic transformation satisfies the boundary and monotonicity requirements in equation (39), and it is possible to fulfill equation (38) with minimal deviation from a theoretical profile when an appropriate shape factor is chosen. Table 1 sets forth transformations, materials and geometries for non-magnetic cloaks designed for several important central wavelengths across the visible wavelength regime including 488 nm (Ar-ion laser), 532 nm (Nd:YAG laser), 589.3 run (sodium D-line), and 632.8 nm (He—Ne laser). In the calculations, the permittivity of silver is taken from well accepted experimental data (see Johnson, P. B., and R. W. Christy, Phys. Rev. B 6 4370-4379,1972), and the dielectric constant of silica is from tabulated data (see Palik, E. D., Handbook of Optical Constants of Solids, Academic Press, New York, 1997. The same design and transformation work for similar cylindrical cloaks with the same shape factor a/b. When the approximate quadratic function is fixed for a given design wavelength, the filling fraction function $f(r)$ is determined by:

$$f(r) = \frac{Re(\varepsilon_d) - (g^{-1}(r)/r)^2}{Re(\varepsilon_d - \varepsilon_m)} \quad (41)$$

TABLE 1

Approximate quadratic transformations and materials for constructing a cloak with alternating slices

| λ | $\epsilon_1$ | $\epsilon_2$ | p × ($b^2$/a) | a/b |
|---|---|---|---|---|
| 488 nm | $\epsilon_{Ag} = -8.15 + 0.11i$ | $\epsilon_{SiO2} = 2.14$ | 0.0662 | 0.389 |
| 532 nm | $\epsilon_{Ag} = -10.6 + 0.14i$ | $\epsilon_{SiO2} = 2.13$ | 0.0517 | 0.370 |
| 589.3 nm | $\epsilon_{Ag} = -14.2 + 0.19i$ | $\epsilon_{SiO2} = 2.13$ | 0.0397 | 0.354 |
| 632.8 nm | $\epsilon_{Ag} = -17.1 + 0.24i$ | $\epsilon_{SiO2} = 2.12$ | 0.0333 | 0.347 |
| 11.3 nm | $\epsilon_{SiC} = -7.1 + 0.40i$ | $\epsilon_{BaF2} = 1.93$ | 0.0869 | 0.356 |

Figure 6:
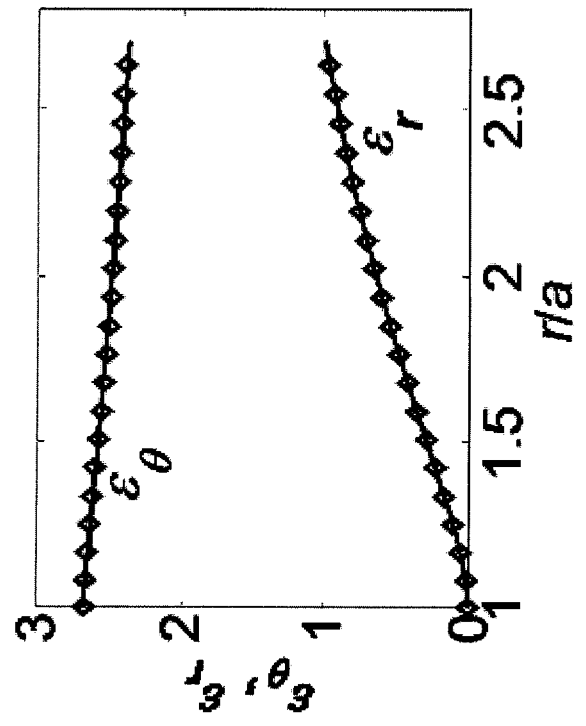
FIG. 6 is a graph of the anisotropic material parameters $\epsilon_r$ and $\epsilon_\theta$ of a non-magnetic cloak made of silver-silica alternating slices corresponding to the third row ($\lambda=532$ nm) in Table 1; the solid lines represent the exact parameters determined by equation 35, and the diamond markers show the parameters on the Wiener's bounds given by equation (37)

FIG. 6 shows the calculated anisotropic material properties of a non-magnetic cloak corresponding to the λ=532 nm case. With the approximate quadratic transformation, the effective parameters $\in_r$ and $\in_\theta$ obtained with the Wiener bounds in equation (37) fit with the exact parameters required for this transformation by equation (35) quite well, with the average deviation of less than 0.5%.

Fabrication of the design is practical, as such vertical wall-like structures are compatible with mature fabrication techniques such as direct deposition and direct etching.

In another example, a cylindrical cloak for TE mode cloaking operable within the mid-infrared frequency range is described, with a gradient in the magnetic permeability, in accordance with equation (35). This frequency range is of interest as it corresponds to the thermal radiation band from human bodies.

Several different approaches involving silicon carbide as component of the metamaterial are described. SiC is a polaritonic material with a phonon resonance band falling into the spectral range centered at around 12.5 μm (800 $cm^{-1}$) This resonance band introduces a sharp Lorentz behavior in the electric permittivity. The dielectric function of SiC at mid-infrared may be described with the following model:

$$\in_{SiC}=\in_{\infty}[\omega^2-\omega_L{}^2+i\gamma\omega]/[\omega^2-\omega_T{}^2+i\gamma\omega] \quad (42)$$

where $\in_{\infty}=6.5$, $\omega_L=972\ \text{cm}^{-1}$, $\omega_T=796\ \text{cm}^{-1}$ and $\gamma=5\ \text{cm}^{-1}$. On the high-frequency side of the resonance frequency, the dielectric function is strongly negative, which makes the optical response similar to that of metals, and the material has been already been utilized in applications such as a mid-infrared superlens. At frequencies lower than the resonance frequency, the permittivity can be strongly positive, which makes SiC a candidate for producing high-permittivity Mie resonators at the mid-infrared wavelength range.

SiC structures may be used to build mid-infrared cloaking devices in a variety of physical configurations. For example, the needle-based structure may be used for the TM mode, where needles are made of a low-loss negative-∈ polaritonic material such as, for example, SiC or $TiO_2$, and are embedded in an infra-red-transparent dielectric such as, for example, ZnS.

In another aspect, a non-magnetic cloak using alternating slices of structure as previously described herein may be used. With SiC as the negative-s material and $BaF_2$ as the positive-∈ slices, the appropriate transformation function and shape factor that fulfills the material property requirements at a preset wavelength may be determined. The result for $\lambda=11.3$ μm ($CO_2$ laser range) is shown in the last row of Table 1.

In yet another example, a cylindrical cloak for the TE mode with the required material properties given in equation (35) is described, having a gradient in the magnetic permeability along the radial direction. $\mu_r$ may vary from 0 at the inner boundary (r=a) to $[\partial g(r^1)/\partial r^1]^2$: at the outer surface (r=b), while the $\in_z$ changes according to $[\partial g(r^1)/\partial r^1]^{-2}$. The magnetic requirement may be accomplished using metal elements like split-ring resonators, coupled nanostrips or nanowires. However, such plasmonic structures exhibit a high loss. A SiC based structure provides an all-dielectric design to a magnetic cloak for the TE mode due to the Mie resonance in subwavelength SiC inclusions.

Figure 7:
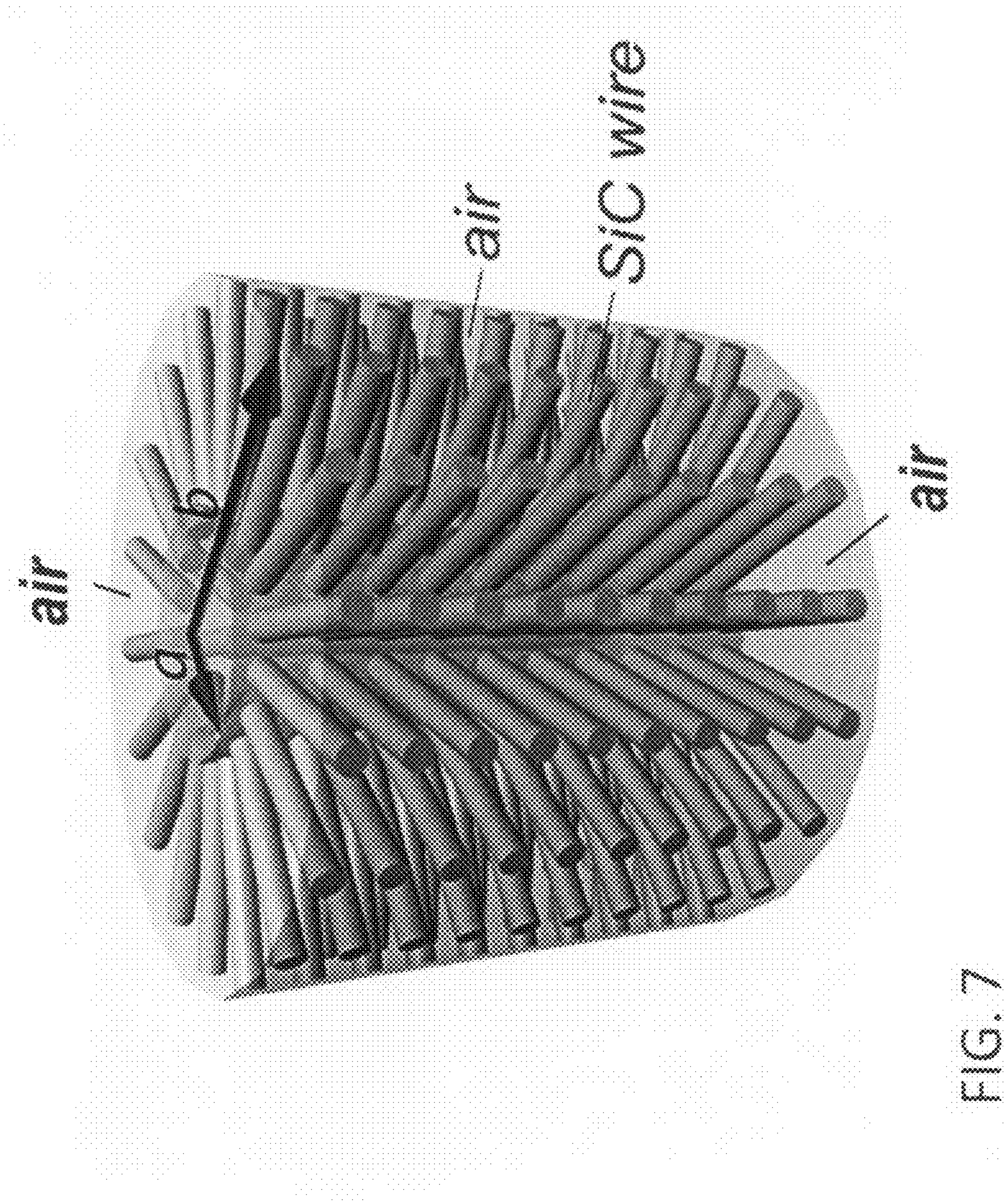
FIG. 7 is a perspective view of a cylindrical non-magnetic cloak with high-order transformations for TE polarization.

Meta-magnetic responses and a negative index of refraction in structures made from high-permittivity materials have been studied extensively in recently years. Magnetic resonance in a rod-shaped high-permittivity particle can be excited by different polarizations of the external field with respect to the rod axis. When a strong magnetic resonance and an effective permeability substantially distinct from 1 are desired, the rod should be aligned parallel to the electric field to assure the maximum possible interaction between the rod and the external field. In the present example the radial permeability has values of less than (but close to) 1, and resonance behavior in the effective permittivity $\in_z$ should be avoided for a minimal loss. Therefore, with the electrical field polarized along the z axis of the cylindrical system, the SiC rods may be arranged along the r axis and form an array in the θ-z plane. The structure is depicted in FIG. 7, where arrays of SiC wires along the radial direction are placed between the two surfaces of the cylindrical cloak.

Figure 8:
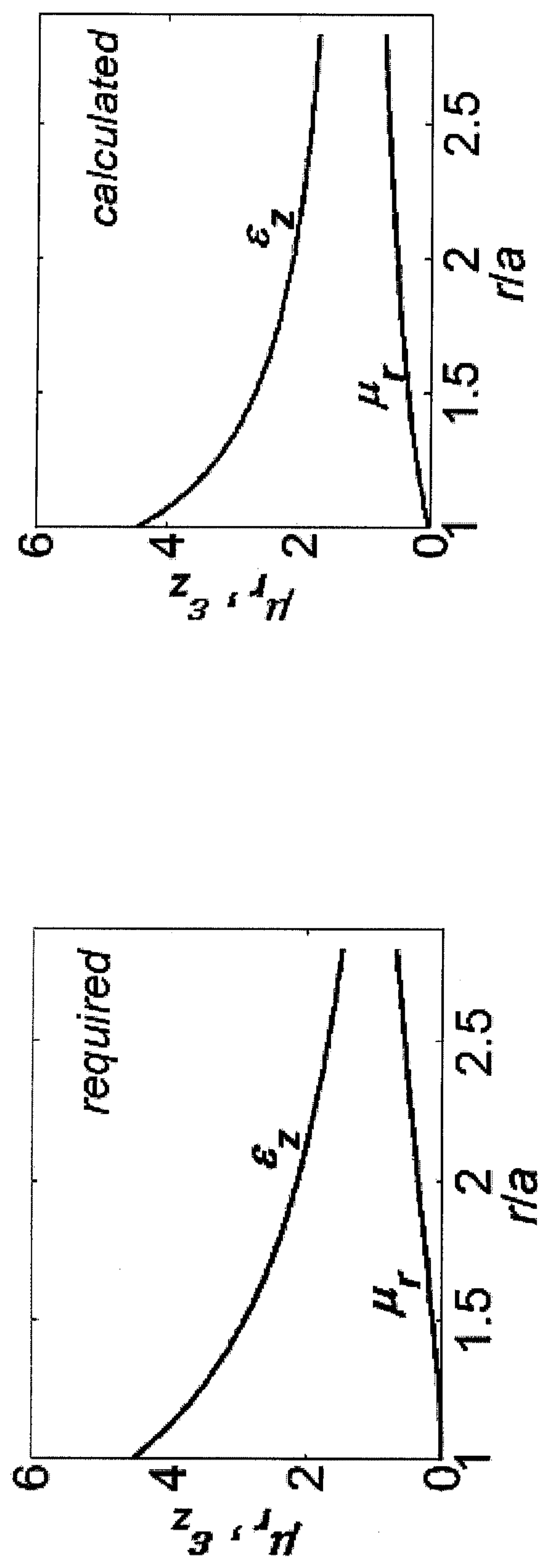
FIG. 8 shows a comparison of the theoretical and the calculated values of effective parameters $\mu_r$ and $\epsilon_z$ for a cylindrical TE cloak with SiC wire arrays at a design wavelength of $\lambda=13.5$ μm.

The effective permeability of the system may be estimated as follows using the approach of O'Brien and Pendry (see O'Brien, S., and J. B. Pendry, J. Phys. Condens. Matter. 14, 4035-4044, 2002)

$$\mu_r = \frac{2}{kL_1^2}\frac{L_1 J_1(kL_1) - tJ_1(kt) + a_0 tH_1^{(1)}(kt) - a_0 L_1 H_1^{(1)}(kL_1) + c_0 tJ_1(nkt)/n}{J_0(kL_2/2 - a_0 H_0^{(1)}(kL_2/2)} \quad (43)$$

where h and ϕ represent the periodicities along the z and θ directions respectively, t denotes the radius of each wire, $n=\sqrt{e_{SiC}}$ is the refractive index, $k=2\pi/\lambda_0$ denotes the wave vector, $L_1=\sqrt{hr\phi/\pi}$ and $L_2=(h+r\phi)/2$ represent the two effective unit sizes based on area and perimeter estimations respectively. $a_0=[nJ_0(nkt)J_1(kt)-J_0(kt)J_1(nkt)]/[nJ_0(nkt)H_1{}^{(1)}(kt)-H_0{}^{(1)}(kt)J_1(nkt)]$ and $c_0=[J_0(kt)-a_0H_0{}^{(1)}(kt)]/J_0(nkt)$ are the scattering coefficients, and the Bessel functions in the equation follow the standard notations. The permittivity along the z direction may be approximated using Maxwell-Garnett method. In the design disclosed herein we choose the appropriate transformation geometry and operational wavelength such that the calculated effective parameters $\mu_r$ and $\in_z$ follow equation (35) with tolerable deviations. FIG. 8 shows the theoretically required and the calculated $\mu_r$ and $\in_z$ for a TE cloak at $\lambda=13.5$ μm. The parameters used for this calculation are a=15 μm, a/b=0.35, t=1.2 μm, h=2.8 μm, ϕ=10.6°, and the p coefficient in the quadratic transformation is $0.5a/b^2$. Good agreement between the required values and the calculated ones based on analytical formulae, and the imaginary part in the effective permeability is less than 0.06. This computation verifies the feasibility of the proposed cloaking system based on SiC wire arrays for the TE polarization. In FIG. 8 the magnetic parameter $\mu_r$ is calculated using equation (43), and the electric parameter $\in_z$ is obtained based on Maxwell-Garnett method.

In another aspect, a cloaking device structure may be a spherical or other shaped cloaking structure. The specific geometrical shape, the size and other design parameters of the structure, such as the spatial variation of material properties, may be chosen using the general approach described herein so as to be adaptable to the wavelength, the degree of cloaking, and the properties of the object to be cloaked. Loss and gain may be introduced in various portions of the structure.

The examples shown herein have used analytic profiles for the material properties so as to illustrate certain of the principles which may influence design of cloaking structures. However, since electromagnetic simulations using finite element methods, for example, are commonly used in design of complex shapes, and have been shown to yield plausible results, the use of such simulations are envisaged as useful in apparatus design. Ray tracing programs may be effectively used in situations where the spatial component of the material properties, and of the geometry, are slowly varying with respect to a wavelength at the operating frequencies. In optics, this is termed an adiabatic approximation.

Certain aspects, advantages, and novel features of the claimed invention have been described herein. It would be understood by a person of skill in the art that not all advantages may be achieved in practicing a specific embodiment. The claimed invention may be embodied or carried out in a manner that achieves or optimizes one advantage or group of advantages as taught herein without necessarily achieving other advantages as may have been taught or suggested.

It is therefore intended that the foregoing detailed description be regarded as illustrative rather than limiting, and that it be understood that it is the following claims, including all equivalents, that are intended to define the spirit and scope of this invention.

What is claimed is:

1. An apparatus for modifying the visibility properties of an object, comprising:

a structure formed of a plurality of metamaterial layers having differing electromagnetic properties determined at a plurality of design wavelengths, wherein the electromagnetic properties of the metamaterial layers of the plurality of metamaterial layers are selected so than an electromagnetic wave incident on the apparatus is guided around the object at the plurality of design wavelengths; and, wherein locations of innermost boundaries of differing metamaterial layers of the plurality of metamaterial layers are dependent on differing selected design wavelengths of the plurality of design wavelengths and the matamaterial comprises a dielectric having inclusions of a metal, and wherein at least one portion of said apparatus is positioned such that only one design wavelength propagates therethrough.

2. The apparatus of claim 1, wherein the structure is configured to be disposed between an object and an observer.

3. The apparatus of claim 1, wherein the structure includes a gain medium.

4. The apparatus of claim 3, wherein the gain medium is a semiconductor capable of spontaneous emission at at least one wavelength of the plurality of wavelengths.

5. The apparatus of claim 1, wherein the material properties of each layer are selected so that outermost boundary of a metamaterial layer of the plurality of metamaterial layers determined for one or more of the design wavelengths of the plurality of design wavelengths is substantially coincident with the outer boundary of the structure.

6. The apparatus of claim 1, where each layer is formed from a plurality of conformal layers.

7. The apparatus of claim 1, wherein a least a portion of the structure is formed of metamaterial layers wherein proximal layers have an effective refractive index of less than unity.

8. The apparatus of claim 1, wherein the metamaterial properties of the layers at a first design wavelength are selected such that electromagnetic waves of a second design wavelength may penetrate into the structure so as to be guided by layers having metamaterial properties suitable for guiding the second design wavelength.

9. The apparatus of claim 8, wherein gain medium layers are included in the layers of the first design wavelength so as to compensate for loss of the metamaterial at the second design wavelength.

10. The apparatus of claim 1, wherein the structure is a sphere with an interior void containing an object to be cloaked.

11. The apparatus of claim 1, wherein the structure is a cylinder of finite length having a symmetrical cylindrical void therein.

12. A method of modifying an observability of an object, comprising:

providing a structure fabricated from a plurality of metamaterial layers having differing electromagnetic properties determined at a plurality of design wavelengths; and the metamaterial comprises a dielectric having inclusions of a metal, wherein the electromagnetic properties of the metamaterial layers of the plurality of metamaterial layers are selected so than an electromagnetic wave incident on the apparatus is guided around the object at a plurality of design wavelengths; and wherein locations of innermost boundaries of differing metamaterial layers of the plurality of metamaterial layers are dependent on differing selected design wavelengths of the plurality of design wavelengths, wherein at least one portion of said apparatus is positioned such that only one design wavelength propagates therethrough; and disposing the structure between an observer and the object.

* * * * *

UNITED STATES PATENT AND TRADEMARK OFFICE

CERTIFICATE OF CORRECTION

PATENT NO. : 8,488,247 B2
APPLICATION NO. : 12/573610
DATED : July 16, 2013
INVENTOR(S) : Wenshan Cai et al.

It is certified that error appears in the above-identified patent and that said Letters Patent is hereby corrected as shown below:

In the Claims

In column 17, claim 1, line 15, after "wavelengths and the" replace "matamaterial" with --metamaterial--.

In column 17, claim 5, line 27, after "are selected so that" insert --the--.

In column 17, claim 7, line 34, after "claim 1, wherein" replace "a least" with --at least--.

In column 18, claim 12, line 26, before "an electromagnetic wave" replace "than" with --that--.

Signed and Sealed this
Thirty-first Day of December, 2013

Margaret A. Focarino
*Commissioner for Patents of the United States Patent and Trademark Office*